(12) United States Patent
Enokida

(10) Patent No.: US 6,735,763 B1
(45) Date of Patent: May 11, 2004

(54) COMPILER DEVICE AND COMPUTER-READABLE RECORDING MEDIUM WITH A COMPILER RECORDED THEREIN

(75) Inventor: Tsutomu Enokida, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/479,814

(22) Filed: Jan. 7, 2000

(30) Foreign Application Priority Data

Jun. 29, 1999 (JP) .......................................... 11-183880

(51) Int. Cl.[7] .................................................. G06F 9/45
(52) U.S. Cl. .......................................... 717/143; 717/8
(58) Field of Search ................................ 717/140, 143, 717/139, 108

(56) References Cited

U.S. PATENT DOCUMENTS

| | | | | |
|---|---|---|---|---|
| 5,465,363 A | * | 11/1995 | Orton et al. | 709/107 |
| 5,560,029 A | * | 9/1996 | Papadopoulos et al. | 712/25 |
| 5,590,326 A | * | 12/1996 | Manabe | 711/150 |
| 5,715,441 A | * | 2/1998 | Atkinson et al. | 707/1 |
| 5,761,670 A | * | 6/1998 | Joy | 707/103 |
| 5,862,376 A | * | 1/1999 | Steele, Jr. et al. | 709/225 |
| 5,890,153 A | * | 3/1999 | Fukuda et al. | 707/8 |
| 5,946,487 A | * | 8/1999 | Dangelo | 717/148 |
| 5,946,711 A | * | 8/1999 | Donnelly | 711/152 |
| 6,009,426 A | * | 12/1999 | Jouenne et al. | 707/8 |
| 6,026,401 A | * | 2/2000 | Brealey et al. | 707/8 |
| 6,047,377 A | * | 4/2000 | Gong | 713/201 |
| 6,052,731 A | * | 4/2000 | Holdsworth et al. | 709/229 |
| 6,128,771 A | * | 10/2000 | Tock et al. | 717/111 |
| 6,134,594 A | * | 10/2000 | Helland et al. | 709/229 |
| 6,138,238 A | * | 10/2000 | Scheifler et al. | 713/200 |
| 6,141,794 A | * | 10/2000 | Dice et al. | 717/118 |
| 6,154,741 A | * | 11/2000 | Feldman | 707/9 |
| 6,161,121 A | * | 12/2000 | Hardy et al. | 709/104 |
| 6,167,423 A | * | 12/2000 | Chopra et al. | 709/100 |
| 6,212,608 B1 | * | 4/2001 | Bak | 711/152 |
| 6,237,043 B1 | * | 5/2001 | Brown et al. | 709/316 |
| 6,289,410 B1 | * | 9/2001 | Cummins | 710/200 |
| 6,314,563 B1 | * | 11/2001 | Agesen et al. | 717/108 |
| 6,317,868 B1 | * | 11/2001 | Grimm et al. | 709/225 |
| 6,321,358 B1 | * | 11/2001 | Anderson | 714/763 |
| 6,330,714 B1 | * | 12/2001 | Hicks et al. | 717/131 |
| 6,343,339 B1 | * | 1/2002 | Daynes | 710/200 |
| 2001/0032281 A1 | * | 10/2001 | Daynes | 710/200 |

OTHER PUBLICATIONS

Microsoft Press, Computer Dictionary, 1997, Microsoft Press, third edition, p. 105, 106, 229, 261.*

Tsa et al., Performance Study . . . , 1998, IEEE, p. 1–12.*

Xu et al., Dynamic Instrumentation . . . , 1999, ACM, 49–59.*

* cited by examiner

Primary Examiner—John Chavis
(74) Attorney, Agent, or Firm—Greer, Burns & Crain, Ltd.

(57) ABSTRACT

A compiler device comprising a compiler section for generating an object program to be executed through generation of a thread by compiling a source program based on object-oriented programming. An object data detector detects the object data for a method based on the class definition of the source program. An object-code generator incorporates the result of detection in the object data detector into the object program. Further, when executing the object program, the object-code generator incorporates into the object program an exclusive-control instruction for controlling such that only one thread out of a plurality of threads can execute the method according to object-data-retention information.

6 Claims, 23 Drawing Sheets

FIG.7

(CLASS-USER PROGRAM)

① INVOKE B "NEW" RETURNING OBJB.
② INVOKE OBJB "M1".

⇓ (DEVELOPMENT OF AN EXECUTION INSTRUCTION AFTER COMPILING)

①-1 CALL " FACTORY-OBJECT GENERATION LIBRARY"
 ( A FACTORY OBJECT FOR THE B CLASS IS GENERATED)

①-2 CALL " METHOD CALL"
 ( A METHOD NEW IS CALLED)

② CALL " METHOD CALL"
 ( A METHOD M1 IS CALLED)

FACTORY DEFINITION

IDENTIFICATION DIVISION.
METHOD-ID. M.
PROCEDURE DIVISION.
:
END METHOD M.

⇓ (DEVELOPMENT OF AN EXECUTION INSTRUCTION AFTER COMPILING)

CALL " LOCK CONTROL LIBRARY 1"
↓
PROCEDURE
↓
CALL " LOCK CONTROL LIBRARY 2"

(FACTORY OBJECT FOR THE B CLASS)

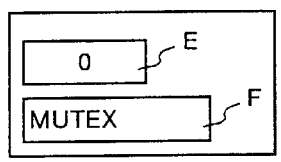

(OBJECT INSTANCE FOR THE B CLASS)

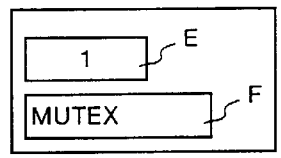

FIG.13

```
┌CLASS DEFINITION─────────────────┐
│                                  │
│   IDENTIFICATION DIVISION.       │
│   CLASS-ID. FJBASE.              │
│                                  │
│  ┌FACTORY DEFINITION──────────┐  │
│  │                             │  │
│  │  IDENTIFICATION DIVISION.   │  │
│  │  FACTORY.                   │  │
│  │  PROCEDURE DIVISION.        │  │
│  │                             │  │
│  │  ┌─────────────────────┐    │  │
│  │  │ METHOD DEFINITION   │    │  │
│  │  └──────────────── NEW─┘    │  │
│  │                             │  │
│  │  END FACTORY.               │  │
│  └─────────────────────────────┘  │
│                                  │
│  ┌OBJECT DEFINITION───────────┐  │
│  │                             │  │
│  │  IDENTIFICATION DIVISION.   │  │
│  │  OBJECT.                    │  │
│  │  PROCEDURE DIVISION.        │  │
│  │                             │  │
│  │  ┌─────────────────────┐    │  │
│  │  │ METHOD DEFINITION   │    │  │
│  │  └──────────────── M1─┘ ... │  │
│  │  └──────────────── M2─┘     │  │
│  │                             │  │
│  │  END OBJECT.                │  │
│  └─────────────────────────────┘  │
└──────────────────────────────────┘
```

FIG.18

(CLASS-USER PROGRAM)

① INVOKE B "NEW" RETURNING OBJB.
② INVOKE OBJB "M5".

⇩ (DEVELOPMENT OF AN EXECUTION INSTRUCTION AFTER COMPILING)

①-1 CALL " FACTORY-OBJECT GENERATION LIBRARY"
 (FACTORY OBJECT FOR THE B CLASS IS GENERATED)

①-2 CALL " METHOD CALL"
 (A METHOD NEW IS CALLED)

② CALL " METHOD CALL"
 (A METHOD M5 IS CALLED)

─FACTORY DEFINITION─
IDENTIFICATION DIVISION.
METHOD-ID. M.
PROCEDURE DIVISION.
 :
END METHOD M.

⇩ (DEVELOPMENT OF AN EXECUTION INSTRUCTION AFTER COMPILING)

CALL " LOCK CONTROL LIBRARY 1"
↓
PROCEDURE
↓
CALL " LOCK CONTROL LIBRARY 2"

(FACTORY OBJECT
FOR THE B CLASS)

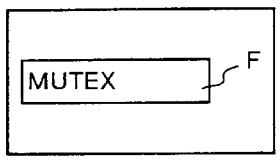

(OBJECT INSTANCE
FOR THE B CLASS)

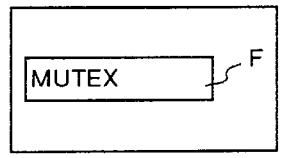

COMPILER DEVICE AND COMPUTER-READABLE RECORDING MEDIUM WITH A COMPILER RECORDED THEREIN

FIELD OF THE INVENTION

The present invention relates to a compiler device which can easily prevent generation of an access conflict occurring when object data is accessed from a plurality of threads by automatically serializing the access of the plurality of clients. The present invention also relates to a computer-readable recording medium with a compiler for the compiler device recorded therein.

BACKGROUND OF THE INVENTION

Conventionally, there has been used a client-server system in which a plurality of clients share an application program on a server for effective use of the resources. In such a client-server system, a thread for launching an application program is generated in response to initiation by a client. When a plurality of threads are generated for one object data in response to initiation by a plurality of clients then there occurs a conflict between the threads. A means and a method for effectively avoiding such an access conflict was required.

FIG. 23 is a block diagram showing configuration of a client-server system based on the conventional technology as described above. The client-server system shown in this figure comprises a server 1, a client $4_1$ and a client $4_2$ each connected to the server 1 via a network 3. In the server 1, an application program $AP_1$ and an application program $AP_2$ are programs each in an execution format with a source program compiled by means of the object-oriented programming, and are started by the client $4_1$ and client $4_2$.

The application program $AP_1$ corresponds to a super class $C_1$ in the object-oriented programming. On the other hand, the application program $AP_2$ corresponds to a subclass $C_2$ inheriting the super class $C_1$. With the inheritance relationship between the two classes, a common area $C_0$ (object data) of the super class $C_1$ is accessed when the application program $AP_1$ and application program $AP_2$ are started. A thread generator 2 generates a thread $S_1$ and a thread $S_2$ to execute the application program $AP_1$ and application program $AP_2$.

In the above-described configuration, when the application program $AP_1$ and application program $AP_2$ in the server 1 are started by the client $4_1$ and client $4_2$, the thread generator 2 generates the thread $S_1$ and thread $S_2$ respectively. When the application program $AP_1$ and application program $AP_2$ are executed, there occurs an access conflict in which the thread $S_1$ and thread $S_2$ concurrently access the common area $C_0$ (object data). In order to prevent the access conflict it is required to provide exclusive controls for serializing the thread $S_1$ and thread $S_2$ so that the thread $S_1$ and thread $S_2$ do not concurrently access the common area $C_0$ (object data). The exclusive controls are the controls for avoiding an access conflict by giving access rights to the common area $C_0$ to the thread $S_1$ (or the thread $S_2$) and giving the access rights to the thread $S_1$ (or the thread $S_1$) when the access from thread $S_1$ terminates.

As an example of the exclusive controls based on the conventional technology, there has been employed a method in which a user of an application program makes a thread acquire a lock to execute the application program. The lock is acquire through a manual input of a command or the like by the user before the application program is executed (this method is described as a first method hereinafter). The application program is executed only by the thread having acquired the lock, and other threads can not execute the application program. When execution of the application program is finished, the lock is released by the user. The application program can then be executed by any other thread. Further, as another example of exclusive controls in the conventional technology, there has been employed a method in which a programmer describes instructions to execute the above-described exclusive controls in the definition of a method when creating the super class $C_1$ and the subclass $C_2$ (This method is described as a second method hereinafter).

As described above, conventionally the exclusive controls are provided by applying the first or second method to avoid an access conflict in which a plurality of threads concurrently access the common area $C_0$ (object data).

In the first method, however, as acquisition/release of a lock is performed manually by a user, the user may sometimes make a mistake such as forget to release the lock, which may in turn cause the trouble that other thread (user) can not access the application program for a long time. Therefore, the first method may lead to lower efficiency in use of an application program, and employment of this method is not always advantageous. Further, in the first method, it is difficult for a user to intentionally provide exclusive controls for a data structure of the application program, especially for a class in which object data exists. To overcome this difficulty, in the first method, the exclusive controls are provided for each application program regardless of presence or absence of object data in the class. However, there may occur a case in which exclusive controls are executed to an application that does not basically require any exclusive controls. In such a case, the use efficiency of the application program is disadvantageously lowered.

In the second method, although instructions are described by a programmer for describing the method to provide the above-described exclusive controls, there is a possibility that incorrect commands for exclusive controls are described due to a human error. In this case, there occurs the trouble that exclusive controls are not executed successfully. Thus, the second method is also not recommendable. As described, the first and second methods require users (including programmers) a heavy work load, yet the methods do not always insure success in prevention of an access conflict.

SUMMARY OF THE INVENTION

It is an object of the present invention to provide a compiler device which can easily avoid an access conflict over object data among a plurality of threads without requiring any particular work load to users. It is another object of the present invention to provide a computer-readable recording medium with a compiler recorded therein.

According to one aspect of this invention, when a source program is compiled, a detection unit detects the presence or absence of an object data for a method based on the class definition in the source program. A first incorporation unit incorporates the result of detection into the object program as object-data-retention information. Further, a second incorporation unit incorporates an exclusive-control instruction into the object program. Therefore, when the object program is executed, one of a plurality of threads can only execute the method corresponding to the object data under the exclusive controls.

As described above, the object-data-retention information and exclusive-control instruction are automatically incorporated into the object program during compilation. Therefore, generation of access conflict over object data between a plurality of threads can easily be avoided without imposing any particular burden on the user.

Further, when the source program is compiled, an inheritance-relation check unit checks an inheritance relationship for a class in the source program, a detection unit detects presence or absence of object data for a method of a class inherited by the class. The first incorporation unit then incorporates a result of detection into the object program as the object-data-retention information, and the second incorporation unit incorporates the exclusive-control instruction into the object program. Therefore, when the object program is executed, only one of a plurality of threads can execute the method corresponding to a class inherited by the class under the exclusive controls.

As described above, the inheritance relationship for a class is checked during compilation of the program, and the object-data-retention information and the exclusive-control instruction according to the result of checking are automatically incorporated into the object program. Therefore, generation of access conflict over object data between a plurality of threads can easily be avoided without imposing any particular burden on the user based on considerations to an inheritance relationship for the class.

According to another aspect of this invention, when a source program is compiled, a detection unit detects the presence or absence of an object data for a method based on class definition in the source program, and an incorporation unit incorporates an exclusive-control instruction into an object program. Therefore, when the object program is executed, only one of a plurality of threads can execute the method for which object data is detected under the exclusive controls. In addition, for a method for which object data is not detected, the same method as that described above is executed by the plurality of threads without executing the exclusive controls.

As described above, the exclusive-control instruction is automatically incorporated into the object program during compilation of the object program. Therefore, generation of access conflict over object data between a plurality of threads can easily be avoided without imposing any particular burden on the user.

According to still another aspect of this invention, when a source program is compiled, a detection step is provided in which the presence or absence of an object data is detected based on class definition in the source program, a first incorporation step is provided in which a result of detection is incorporated into the object program as object-data-retention information. Further, a second incorporation step is provided in which an exclusive-control instruction is incorporated into the object program. Therefore, when the object program is executed, only one of a plurality of threads can execute the method corresponding to the object data under the exclusive controls.

As described above, the object-data-retention information and exclusive-control instruction are automatically incorporated into the object program during compilation of the object program. Therefore, generation of access conflict over object data between a plurality of threads can easily be avoided without imposing any particular burden on the user.

Further, when a source program is compiled, an inheritance-relation check step is provided in which an inheritance relationship for a class in the source program is checked, and a detection step is provided in which the presence or absence of an object data for a method of a class inherited by the class is detected. Further, a first incorporation step is provided in which a result of detection is incorporated into the object program as object-data-retention information, and a second incorporation step is provided in which an exclusive-control instruction is incorporated into the object program. Therefore, when the object program is executed, only one thread of a plurality of threads can execute the method of a class inherited by the class under the exclusive controls.

As described above, the inheritance relationship for a class is checked, and the object-data-retention information and exclusive-control instruction according to the result of checking are automatically incorporated into the object program during compilation of the object program. Therefore, generation of access conflict over object data between a plurality of threads can easily be avoided without imposing any particular burden on the user considering an inheritance relationship for the class, which was thought difficult in the conventional technology.

According to still another aspect of this invention, when a source program is compiled, a detection step is provided in which the presence or absence of an object data is detected based on class definition in the source program, and an incorporation step is provided in which an exclusive-control instruction is incorporated into the object program. Therefore, when the object program is executed, only one of a plurality of threads can execute the method for which object data is detected under the exclusive controls. In addition, for the method for which object data is not detected, the same method as described above is executed by the plurality of threads without provision of the exclusive controls therefor.

As described above, the exclusive-control instruction is automatically incorporated into the object program during compilation of the object program. Therefore, generation of access conflict over object data between a plurality of threads can easily be avoided without imposing any particular burden on the user.

Other objects and features of this invention will become apparent from the following description with reference to the accompanying drawings.

BRIEF DESCRIPTION OF THE DRAWINGS

FIG. 7 shows operations in the first embodiment;

FIG. 13 explain class definition (FJBASE) in a second embodiment;

FIG. 18 shows operations in the second embodiment;

DESCRIPTION OF THE PREFERRED EMBODIMENTS

A compiler and a computer readable recording medium with a compiler recorded therein according to first and second embodiments of the present invention are described in detail below with reference to the related drawings.

Figure 1:
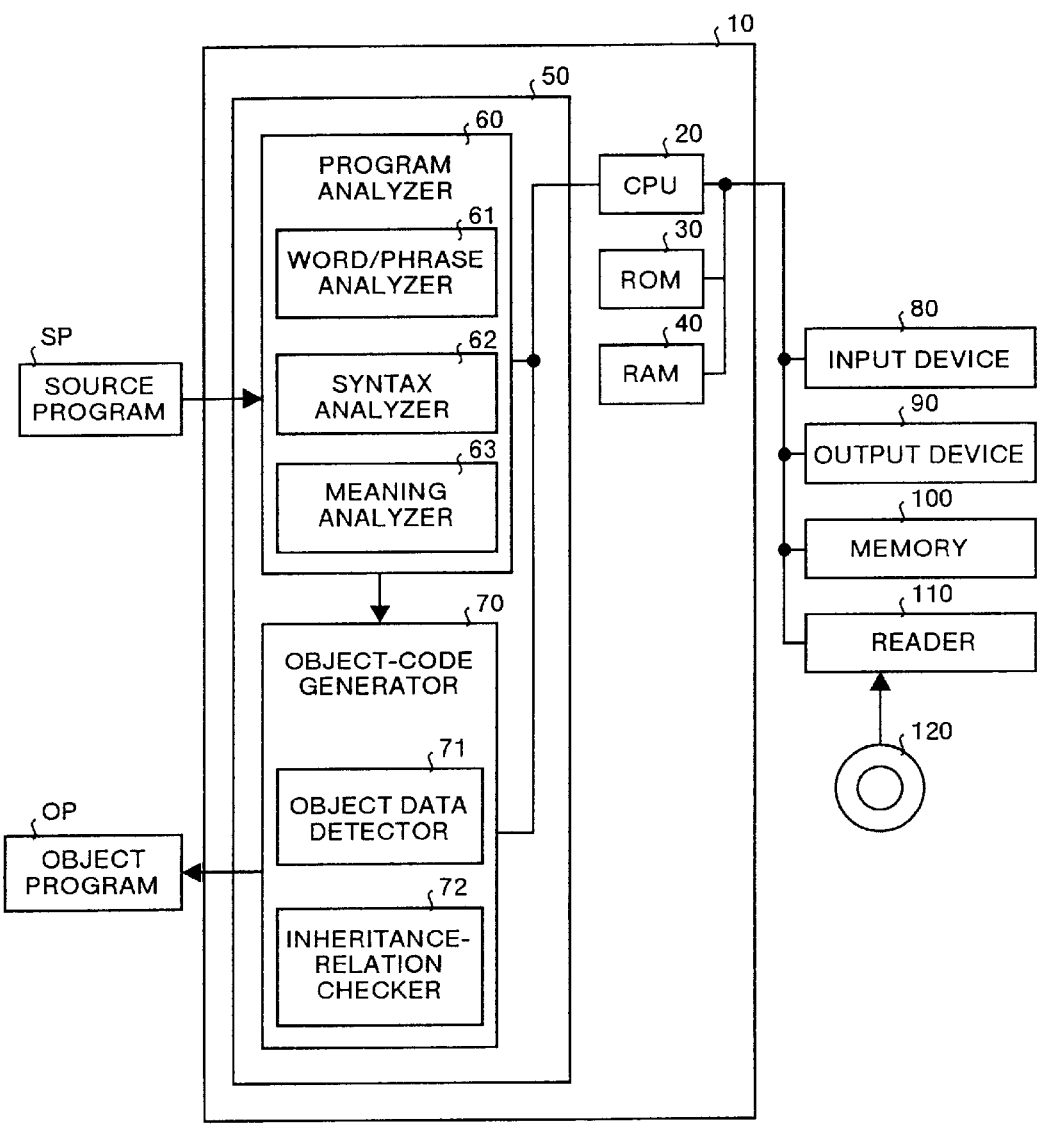
FIG. 1 is a block diagram showing configuration according to a first embodiment of the present invention.

FIG. 1 is a block diagram showing configuration according to a first embodiment of the present invention. In an information processing unit 10, a CPU (Central Processing Unit) 20 controls the operations of the every section of the device. A ROM (Read Only Memory) 30 stores therein various programs executed in the CPU 20, and variables, initial values, and so on. A RAM (Random Access Memory) 40 temporarily stores therein data for various types of computing executed in the CPU 20. A 15 compiler section 50 translates a source program SP described with a high-order language to an object program OP based on machine language. The compiler section so has a program analyzer 60 and an object-code generator 70. The source program SP is a program created utilizing the technique of object-oriented programming.

Figure 2:
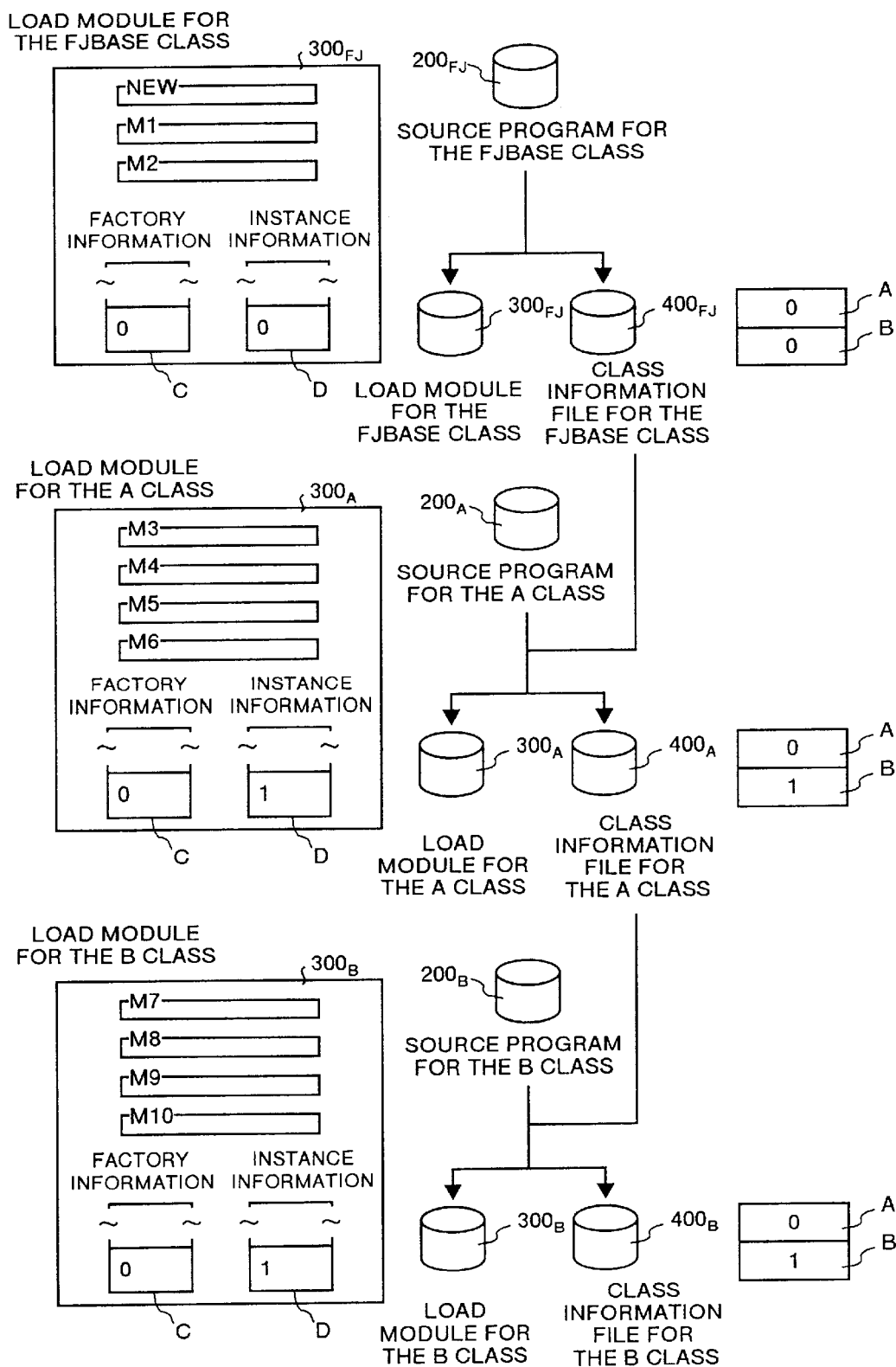
FIG. 2 explains operations in the first embodiment.

Examples of the source program SP is explained with reference to FIG. 2. FIG. 2 shows source programs $200_{FJ}$, a source program $200_A$, and a source program $200_B$ respectively each as a source program SP. The source program $200_{FJ}$ is a source program for FJBASE class, the source program $200_A$ is a source program for A class inheriting the FJBASE class. Further, the source program $200_B$ is a source program for B class inheriting the A class. Namely, there is an inheritance relationship between the FJBASE class, A class, and B class such that the A class inherits the FJBASE class and the B class inherits the A class.

Figure 3:
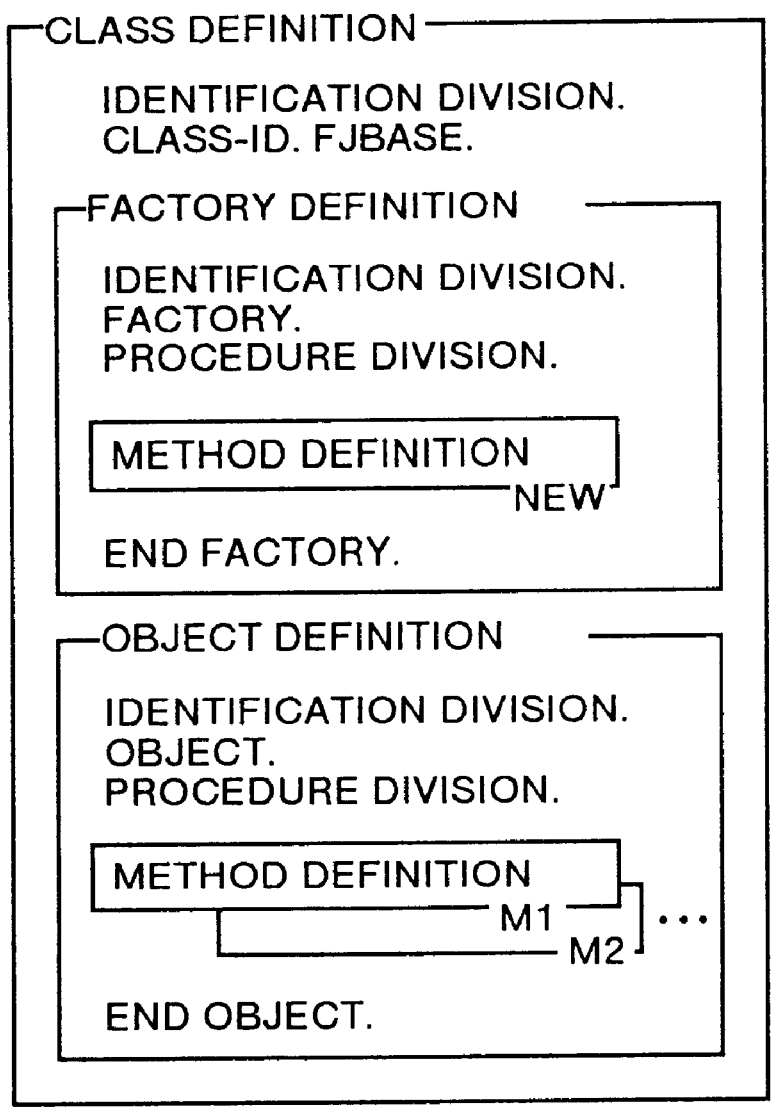
FIG. 3 explains class definition (FJBASE) in the first embodiment.

FIG. 3 explains class definition (FJBASE) for defining the FJBASE class in the source program $200_{FJ}$ shown in FIG. 2. As shown in this figure, the class definition is described using COBOL language as an example of the high-order language. FJBASE is specified as CLASS-ID (class name) in IDENTIFICATION DIVISION which is the title. Factory definition and object definition for the FJBASE class are specified in the class definition. In the factory definition, a factory object for generating an object instance for the FJBASE class is defined. In the factory definition, FACTORY is specified as the IDENTIFICATION DIVISION, whereas method NEW for the factory object is defined in the PROCEDURE DIVISION.

On the other hand, an object for the FJBASE class is defined in the object definition, OBJECT is specified as IDENTIFICATION DIVISION, whereas method M1 and method M2 are specified as PROCEDURE DIVISION. One example of definition of the methods NEW, M1, and M2 is described in the IDENTIFICATION DIVISION and PROCEDURE DIVISION as shown in FIG. 7.

Figure 4:
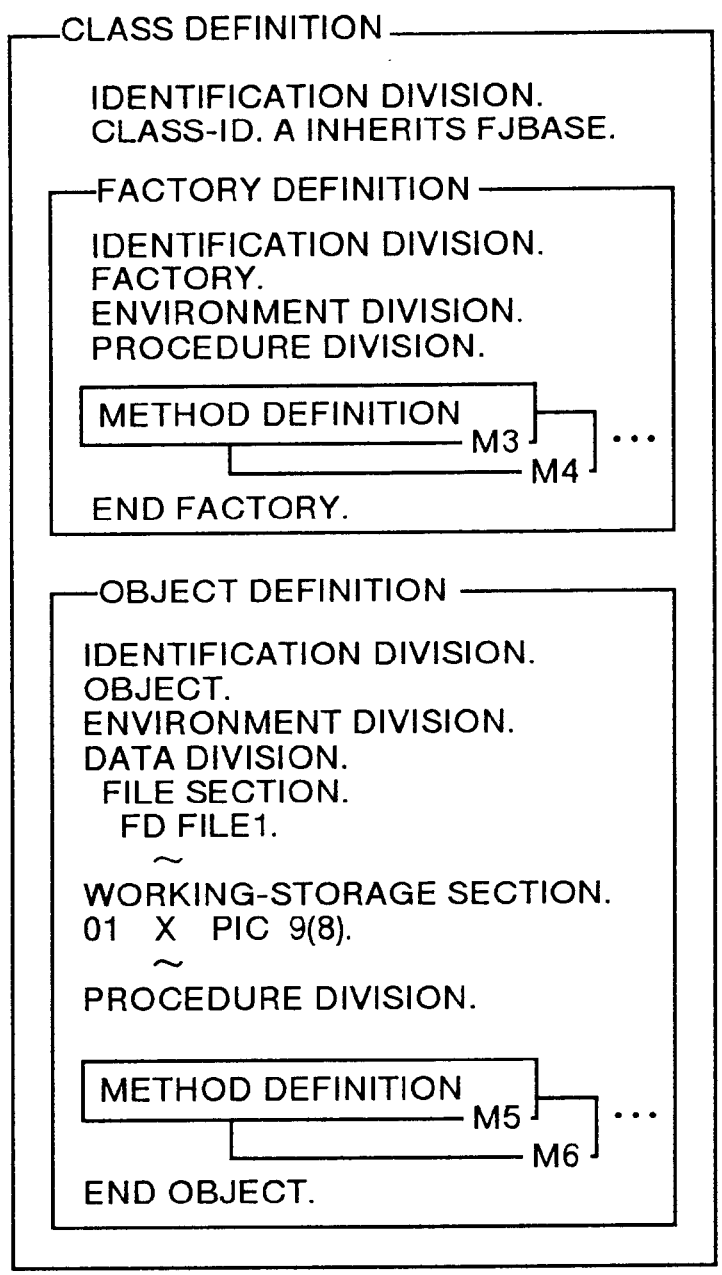
FIG. 4 explains class definition (A) in the first embodiment.

FIG. 4 explains the class definition (A) for defining the A class in the source program $200_A$ shown in FIG. 2. As shown in this figure, A is specified as CLASS-ID in IDENTIFICATION DIVISION. Further, it is specified that A INHERITS FJBASE showing the inheritance relationship between the classes. From the description in the INHERITS ("FJBASE"), it is understood that the A class inherits the FJBASE class. Factory definition and object definition for the A class are described in the class definition respectively. In the factory definition, a factory object for generating an object instance for the A class is defined. In the factory definition, FACTORY is specified in IDENTIFICATION DIVISION, whereas method M3 and method M4 for the factory object are specified in PROCEDURE DIVISION.

On the other hand, an object for the A class is defined in the object definition, and OBJECT is specified as IDENTIFICATION DIVISION. Further, in the object definition for the A class, ENVIRONMENT DIVISION, DATA DIVISION, and PROCEDURE DIVISION are specified. The object data is defined in the DATA DIVISION, whereas method M5 and method M6 are specified in the PROCEDURE DIVISION.

Figure 5:
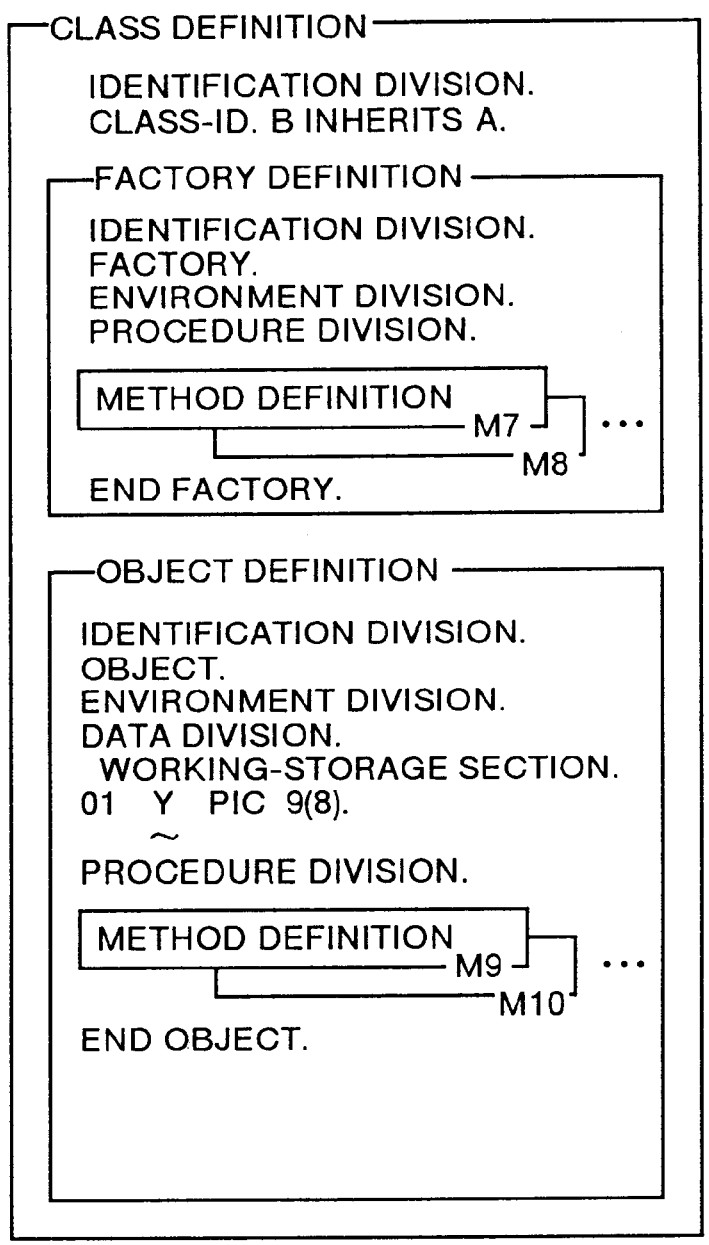
FIG. 5 explains class definition (B) in the first embodiment.

FIG. 5 explains class definition (B) for defining the B class in the source program $200_B$ shown in FIG. 2. As shown in this figure, B is specified as CLASS-ID in IDENTIFICATION DIVISION. Further A is described in INHERITS showing the inheritance relationship between the two classes. From the description in the INHERITS ("A"), it is understood that the B class inherits the A class. Factory definition and object definition for the B class are specified in the class definition. In the factory definition, a factory object for generating an object instance for the B class is defined. In the factory definition, FACTORY is specified in the IDENTIFICATION DIVISION. Further, in the factory definition, ENVIRONMENT DIVISION and PROCEDURE DIVISION are also defined, whereas method M7 and method M8 for the factory object are specified in the PROCEDURE DIVISION.

On the other hand, an object for the B class is defined in the object definition, and OBJECT is specified as IDENTIFICATION DIVISION. Further, in the object definition for the B class, ENVIRONMENT DIVISION, DATA DIVISION, and PROCEDURE DIVISION are described. The object data is defined in the DATA DIVISION, whereas method M9 and method M10 are defined in the PROCEDURE DIVISION.

The program analyzer 60 analyzes the source program SP. This program analyzer 60 comprises a word/phrase analyzer 61 for analyzing words and phrases in the source program SP, a syntax analyzer 62 for analyzing syntaxes, and a meaning analyzer 63 for analyzing the meaning. The object-code generator 70 generates object code from the source program SP based on the result of analysis in the program analyzer 60, and outputs the code as the object program OP.

In the object-code generator 70, an object data detector 71 detects object data in the source program SP. More specifically, the object data detector 71 detects object data (DATA DIVISION) in the source program SP (e.g., the source program $200_{FJ}$, source program $200_A$, and source program $200_B$). An inheritance-relation checker 72 checks the inheritance relationship between the classes in the source program SP (e.g., the source program $200_{FJ}$, source program $200_A$, and source program $200_B$) More specifically, the inheritance-relation checker 72 checks an inheritance relationship between classes by confirming INHERITS shown in FIG. 5 and FIG. 6.

An input device 80 may be a keyboard, mouse or the like, and is used for inputting various data and commands. An output device 90 may be a CRT (Cathode-Ray Tube), LCD (Liquid Crystal Display), printer or the like. This output device 90 is utilized to display the data or print the data. A memory 100 is an external storage device such as a hard disk drive. A reader 110 is a device for reading data and programs recorded on a recording medium 120 such as a CD-ROM (Compact Disk-Read Only Memory).

Operations in the first embodiment are explained below with reference to the flow chart shown in FIG. 6. More specifically, compilation of the source program $200_{FJ}$, source program $200_A$, and source program $200_B$ as the source programs SP shown in FIG. 1 is explained. In step SA1 shown in FIG. 6, at first, the source program $200_{FJ}$ is read into the program analyzer 60. In step SA2, words/phrases, syntaxes and meaning of the source program $200_{FJ}$ are analyzed by the word/phrase analyzer 61, syntax analyzer 62, and meaning analyzer 63. The result of this analysis is provided to the object-code generator 70.

Figure 8:
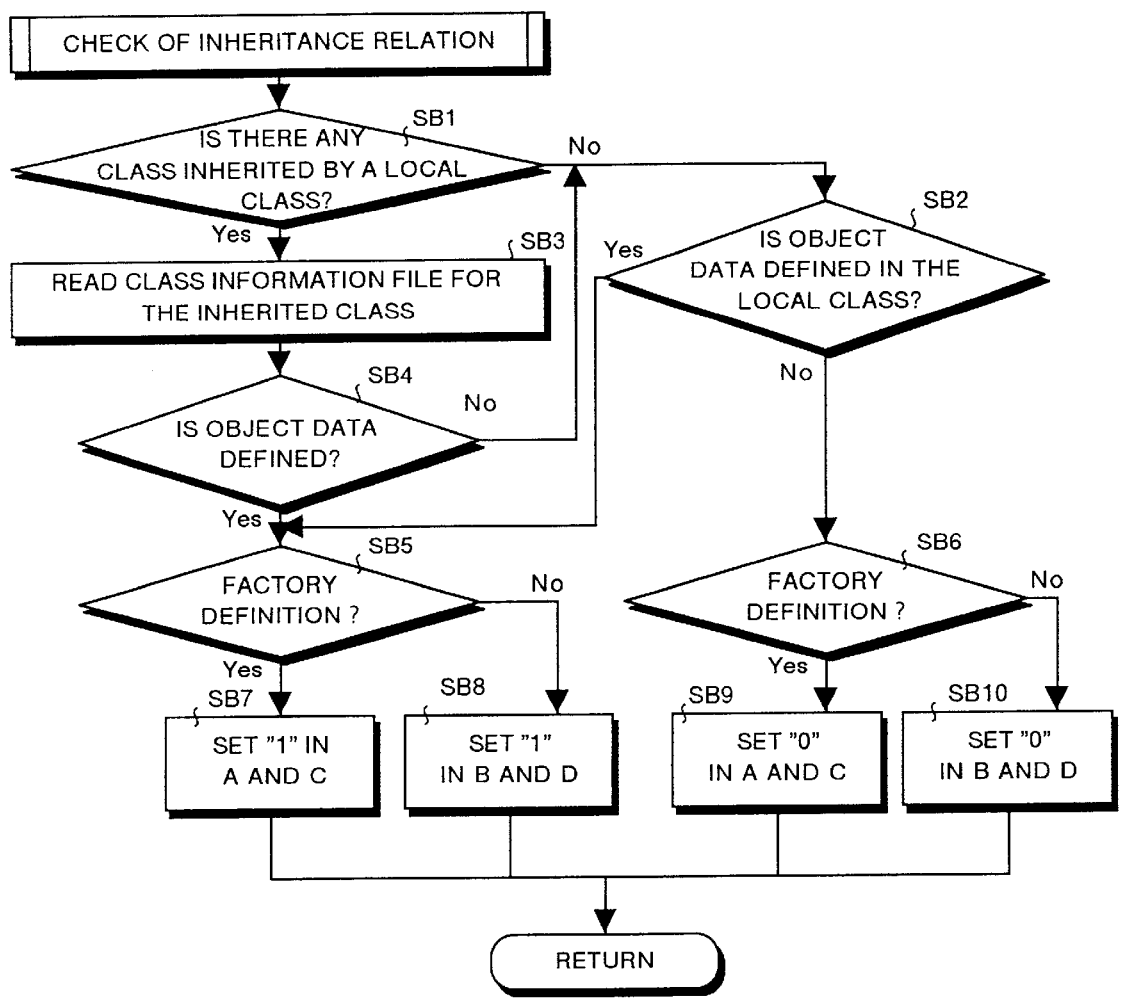
FIG. 8 is a flow chart of an inheritance relationship checking process in the first embodiment.

In step SA3, the inheritance-relation checker 72 in the object-code generator 70 checks the inheritance relationship of the source program $200_{FJ}$. The processing for checking the inheritance relationship is performed by the inheritance-relation checker 72 according to the flow chart shown in FIG. 8. In step SB1, the inheritance-relation checker 72 determine whether or not there is any class inherited by the FJBASE class or not based on the class definition (FJBASE) shown in FIG. 3 for the source program $200_{FJ}$ by confirming the INHERITS. In the case described herein, as the INHERITS is not defined in the class definition (FJBASE) shown in FIG. 3, the inheritance-relation checker 72 regards the result of determination as "No".

In step SB2, the object data detector 71 determines whether object data (DATA DIVISION) is defined in a local class (FJBASE class in this case) or not. In this case, as object data (DATA DIVISION) is not defined in the class definition (FJBASE) shown in FIG. 3, the object data detector 71 regards the result of determination as "No". In step SB6, the object data detector 71 determines whether object data (DATA DIVISION) is defined in the factory definition or not. In this case, as the object data is not defined in the factory definition shown in FIG. 3, the object data detector 71 regards the result of determination as "Yes".

Figure 6:
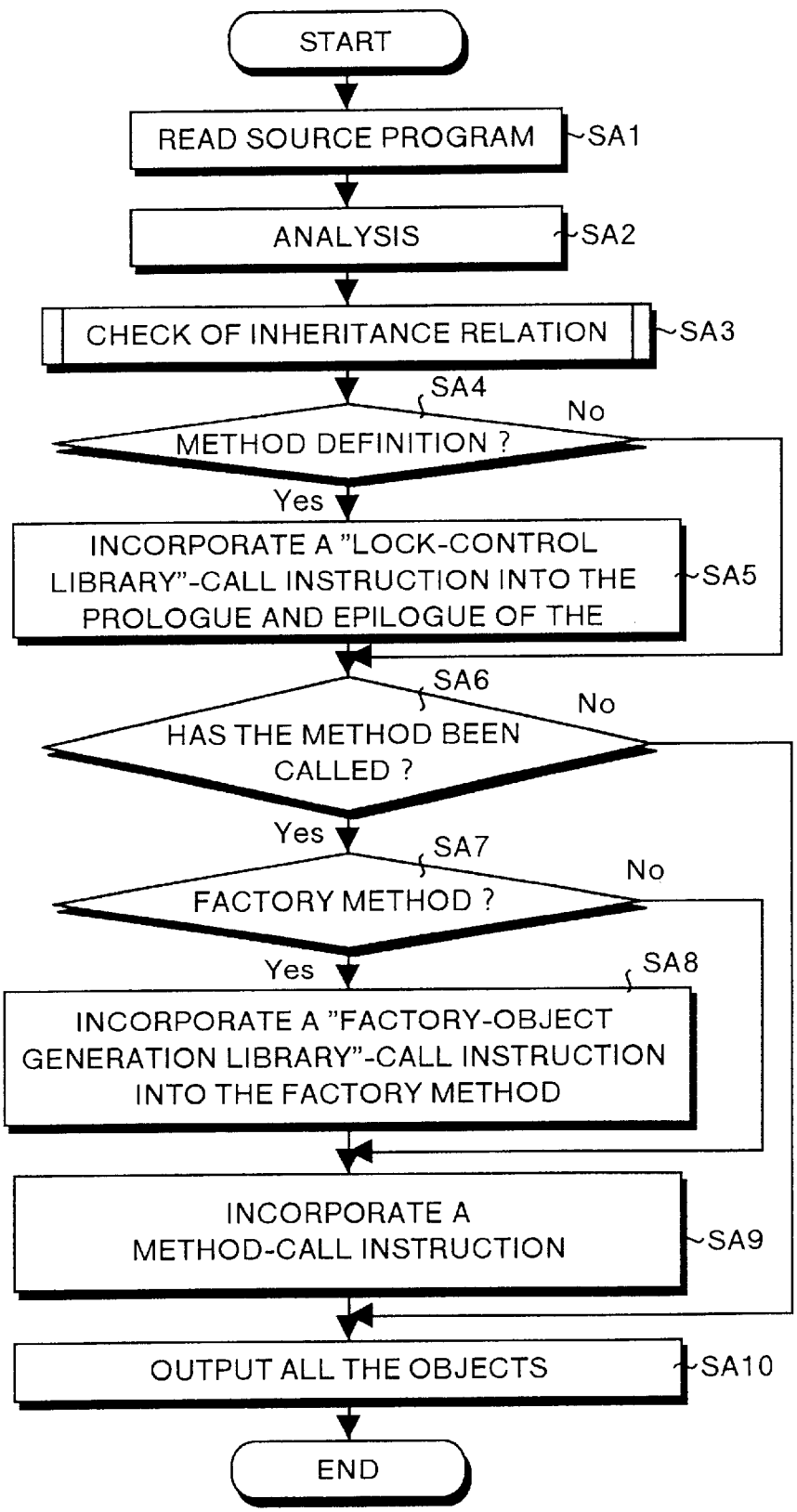
FIG. 6 is a flow chart showing operations in the first embodiment.

In step SB9, the inheritance-relation checker 72 sets "0" in object-data-retention information A and C in a class information file $400_{FJ}$ and a load module $300_{FJ}$ shown in FIG. 2 respectively and returns to the main routine shown in FIG. 6. The load module $300_{FJ}$ and class information file $400_{FJ}$ are generated by compiling the source program $200_{FJ}$. The load module $300_{FJ}$ is a program in an execution format. The class information file $400_{FJ}$ is information indicating whether or not the object data (DATA DIVISION) is defined in the factory definition and object definition (Refer to FIG. 3) in the local class (the FJBASE class in this case) or in the super class inherited by the local class. The class information file $400_{FJ}$ contains of the object-data-retention information A and B.

The object-data-retention information A is information indicating whether or not the object data (DATA DIVISION) is defined in the factory definition. More specifically, "1" is set in the object-data-retention information A when object data (DATA DIVISION) is defined in the factory definition, whereas "0" is set when object data is not defined. Object-data-retention information B is the information indicating whether or not the object data (DATA DIVISION) is defined in the object definition. More specifically, "1" is set in the object-data-retention information B when object data (DATA DIVISION) is defined in the object definition, whereas "0" is set when object data is not defined. The class information files $400_A$ and $400_B$ shown in FIG. 2 are the same type of file as the class information file $400_{FJ}$.

Object-data-retention information C in the load module $300_{FJ}$ is the same information as the object-data-retention information A. Namely, "1" is set in the object-data-retention information C when object data (DATA DIVISION) is defined in the factory definition, whereas "0" is set when object data is not defined. Object-data-retention information D is the same information as the object-data-retention information B. Namely, "1" is set in the object-data-retention information D when object data (DATA DIVISION) is defined in the object definition, whereas "0" is set when object data is not defined.

The object-data-retention information C and D in load modules $300_A$ and $300_B$ shown in FIG. 2 are the same type of information as the object-data-retention information C and D in the load modules $300_{FJ}$. When a result of determination in step SB6 is "No", "0" is set in the object-data-retention information B and D in the class information file $400_{FJ}$ and load module $300_{FJ}$ shown in FIG. 2. The case where the result of determination in step SB6 is "No" includes a case where there is no factory definition in the class definition (FJBASE) shown in FIG. 3.

In step SA4 shown in FIG. 6, the object-code generator 70 determines whether or not a method is defined in the class definition of the source program $200_{FJ}$ shown in FIG. 3. As shown in FIG. 3, method NEW is defined in the factory definition, and methods M1 and M2 are defined in the object definition respectively. Therefore, the object-code generator 70 regards the result of the determination in step SA4 as "Yes" and executes the processing in step SA5. When a method is not defined, the object-code generator 70 regards a result of the determination in step SA4 as "No" and executes the processing in step SA6.

In step SA5, the object-code generator 70 incorporates a "lock control library 1"-call instruction for calling a lock control library 1 (Refer to FIG. 11) onto prologue of the method (procedure) into the load module $300_{FJ}$ (Refer to FIG. 2) as shown in FIG. 7. The lock control library 1 is a library for executing processing of acquiring a lock for the above-described exclusive control. Further, the object-code generator 70 incorporates a "lock control library 2"-call instruction for calling a lock control library 2 (Refer to FIG. 12) onto epilogue of the method (procedure) into the load module $300_{FJ}$ (Refer to FIG. 2) as shown in FIG. 7, and then executes the processing in step SA6. The lock control library 2 is a library for executing processing of releasing the acquired lock. The processing performed by the lock control libraries 1 and 2 is explained later.

In step SA6, the object-code generator 70 determines whether or not invoking of a method is programmed by a class-user program as shown in FIG. 7 in the source program $200_{FJ}$ shown in FIG. 3. When the result of the determination is "No" the object-code generator 70 executes the processing in step SA10. The class-user program shown in FIG. 7 represents a call instruction of a factory-object generation library (Refer to FIG. 9) and a method-call instruction. The factory-object generation library is a library for executing processing of generation the factory object. This processing will be explained in detail later.

When a result of the determination in step SA6 is "Yes", determines in step SA7 whether the method to be called is a factory method (e.g., the method NEW shown in FIG. 3) which is defined in the factory definition or not. When the result of the determination is "Yes" the object-code generator 70 executes the processing in step SA8. When the result of the determination in step SA7 is "No", the object-code generator 70 executes the processing in step SA9. In step SA8, the object-code generator 70 incorporates the "factory-object generation library"-call instruction for calling the factory-object generation library (Refer to FIG. 9) into the load module $300_{FJ}$ (Refer to FIG. 2), and then executes the processing in step SA9.

In step SA9, the object-code generator 70 incorporates an instruction of calling a method (method-call instruction) that calling is instructed in the user program (Refer to FIG. 7) into the load module $300_{FJ}$, and then executes the processing in step SA10. In step SA10, the object-code generator 70 outputs all the objects (the load module $300_{FJ}$ and class information file $400_{FJ}$ in this case). With this operation, compilation of the source program $200_{FJ}$ is finished.

When the source program $200_A$ is read into the program analyzer 60 in step SA1, the program analyzer 60 in step SA2 analyzes the words/phrases, syntaxes, and meaning of the source program 200A. The result of the analysis is provided to the object-code generator 70. In step SA3, the inheritance-relation checker 72 checks the inheritance relationship of the source program $200_A$. The processing for checking the inheritance relationship is performed by the inheritance-relation checker 72 shown in FIG. 8. In step SB1, the inheritance-relation checker 72 determines whether or not there is any class inherited by the A class based on the class definition (A) shown in FIG. 4 for the source program $200_A$ by confirming the INHERITS. In this case, as the INHERITS (FJBASE) is defined in the class definition (A) shown in FIG. 4, the inheritance-relation checker 72 regards the result of determination as "Yes".

In step SB3, the object data detector 71 reads the class information file (class information file $400_{FJ}$ in this case) for the class (FJBASE class in this case) inherited by a local class (A class in this case). In step SB4, the object data detector 71 determines whether or not the object data (DATA DIVISION) is defined in the class definition of the FJBASE class (Refer to FIG. 3) inherited by the A class by confirming the class information file $400_{FJ}$. More specifically, the object data detector 71 determines whether "1" is set in the object-data-retention information A or B of the class information file $400_{FJ}$ or not. In this case, as "0" is set in the object-data-retention information A of the class information file $400_{FJ}$, the object data detector 71 regards the result of the determination in step SB4 as "No" and executes the processing in step SB2.

In step SB2, in the local class (A class in this case), the object data detector 71 determines whether the object data (DATA DIVISION) is defined or not. In this case, as object data (DATA DIVISION) is defined in the object definition shown in FIG. 4, the object data detector 71 regards the result of determination as "Yes". In step SB5, the object data detector 71 determines whether the object data (DATA DIVISION) is defined in the factory definition or not. In this case, as the object data is not defined in the factory definition shown in FIG. 3, the object data detector 71 regards the result of determination as "No".

In step SB8, the inheritance-relation checker 72 sets "1" in the object-data-retention information B and D in the class information file $400_A$ and in the load module $300_A$ shown in FIG. 2 respectively and returns the system control to the main routine shown in FIG. 6. It is apparent from the fact that "1" is set in the object-data-retention information B and D respectively that, object data (DATA DIVISION) is defined in the object definition for the A class or for the FJBASE class inherited by the A class. When the result of the determination in step SB5 is "Yes", in step SB7 "1" is set in the object-data-retention information A and C.

The source program $200_A$ (A class) is also processed in the manner described above in step SA4 through step SA9 shown in FIG. 6. In step SA10, the object-code generator 70 outputs all the objects (the load module $300_A$ and class information file $400_A$ in this case). With this operation, compilation of the source program $200_A$ is finished.

When the source program $200_B$ is read into the program analyzer 60 in step SA1, the program analyzer 60 in step SA2 analyzes the words/phrases, syntaxes, and meaning of the source program $200_B$. The result of this analysis is provided to the object-code generator 70. In step SA3, the inheritance-relation checker 72 checks the inheritance relationship of the source program $200_B$. The processing for checking the inheritance relationship is performed by the inheritance-relation checker 72 according to the flow chart shown in FIG. 8. In step SB1, the inheritance-relation checker 72 determines whether or not there is any class inherited by the B class or not based on the class definition (B) shown in FIG. 5 for the source program $200_B$ by confirming the INHERITS. In this case, as the INHERITS (A) is defined in the class definition (B) shown in FIG. 5, the inheritance-relation checker 72 regards a result of determination as "Yes".

In step SB3, the object data detector 71 reads the class information file (class information file $400_A$ in this case) for the class (A class in this case) inherited by a local class (B class in this case). In step SB4, the object data detector 71 determines whether or not the object data (DATA DIVISION) is defined in the class definition of the A class (Refer to FIG. 4) inherited by the B class by confirming the class information file $400_A$. More specifically, the object data detector 71 determines whether or not "1" is set in the object-data-retention information A or B of the class information file $400_A$. In this case, as "1" is set in the object-data-retention information B of the class information file $400_A$, the object data detector 71 regards the result of the determination in step SB4 as "Yes" and executes the processing in step SB5.

In step SB5, the object data detector 71 determines whether the object data (DATA DIVISION) is defined in the factory definition or not. In the case described herein, as the object data is not defined in the factory definition shown in FIG. 5, the object data detector 71 regards the result of determination as "No".

In step SB8, the inheritance-relation checker 72 sets "1" in the object-data-retention information B and D in the class information file $400_B$ and in the load module $300_B$ shown in FIG. 2 respectively and returns the system control to the main routine shown in FIG. 6. It is apparent from the fact that "1" is set in the object-data-retention information B and D respectively that, object data (DATA DIVISION) is defined in the object definition for the B class or for the A class inherited by the B class.

The source program 200$_B$ (B class) is also processed in the manner described above in step SA4 through step SA9 shown in FIG. 6. In step SA10, the object-code generator 70 outputs all the objects (the load module 300$_B$ and class information file 400$_B$ in this case). With this operation, compilation of the source program 200$_B$ is finished.

Figure 9:
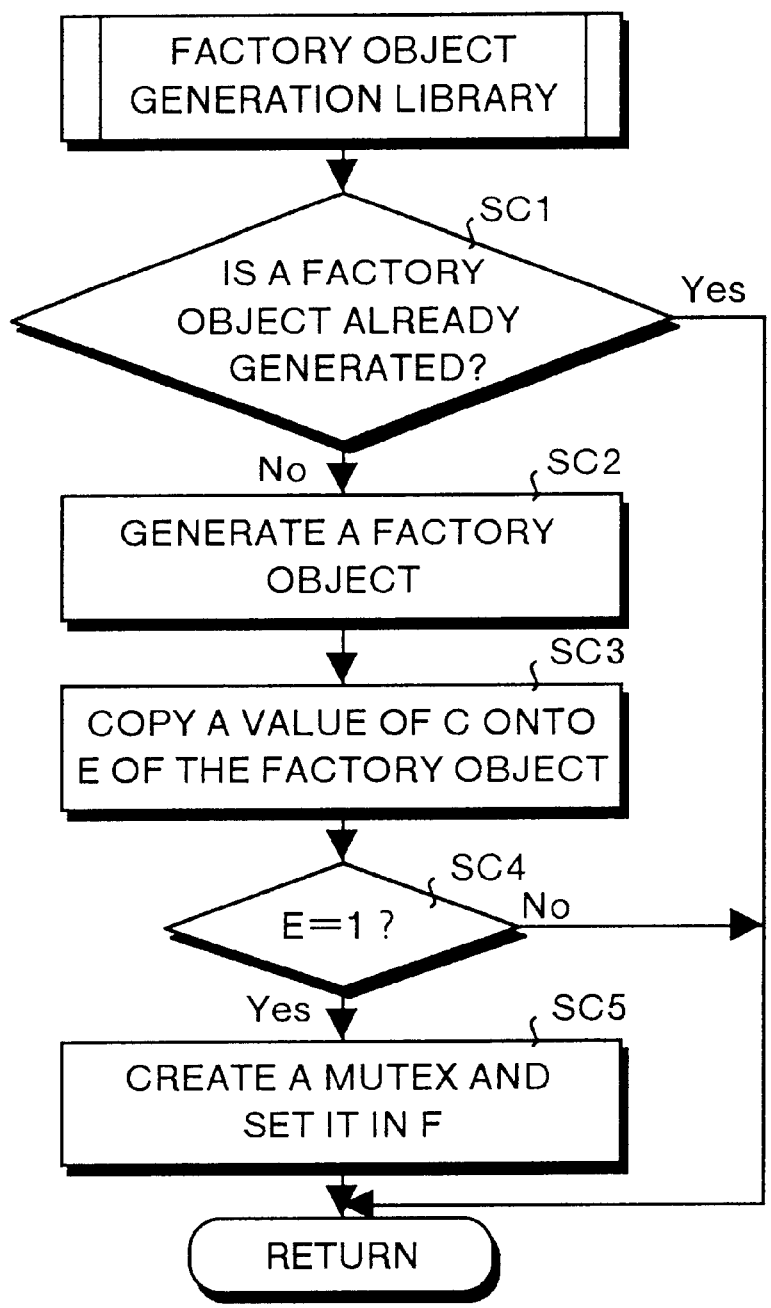
FIG. 9 is a flow chart showing the processing of a factory-object generation library in the first embodiment.

Processing performed for execution of a program is explained below with reference to the flow charts shown in FIG. 9 to FIG. 12. A case is described hereinafter where the information processing unit 10 shown in FIG. 1 is a server and a plurality of clients (not shown) each connected to the server access the server to execute the load module 300$_B$ shown in FIG. 2. When a thread is generated in response to actuation from the client and an object program corresponding to a class-user program shown in FIG. 7 is executed, the factory-object generation library shown in FIG. 9 is called (Refer to ①-1 in FIG. 7).

In step SC1, it is determined whether a factory object is already generated or not. When the result of this determination is "Yes", the system control proceeds to the processing in the main routine. The factory object is used for generating an object instance for the B class. The factory object is generated in the server (information processing unit 10) before the object instance is generated. In this case, assuming that the result of determination in step SC1 is "No", a factory object for the B class shown in FIG. 7 is generated in step SC2. In the next step SC3, the object-data-retention information C ("0" in this case) shown in FIG. 2 is copied to an area of the object-data-retention information E in the factory object for the B class shown in FIG. 7.

In the next step SC4, it is determined whether the object-data-retention information E is "1" or not. When the result of the determination in step SC4 is "Yes", a mutex is created in step SC5, and the mutex is set in the factory object shown in FIG. 7 as a mutex F. The mutex is a flag for providing exclusive controls that only one of a plurality of threads is made executable and the other threads are in the standby state of execution like in the semaphore. In the case described herein, as the object-data-retention information E is "0", the result of determination in step SC4 is "No", and the processing is shifted to the main routine.

Figure 10:
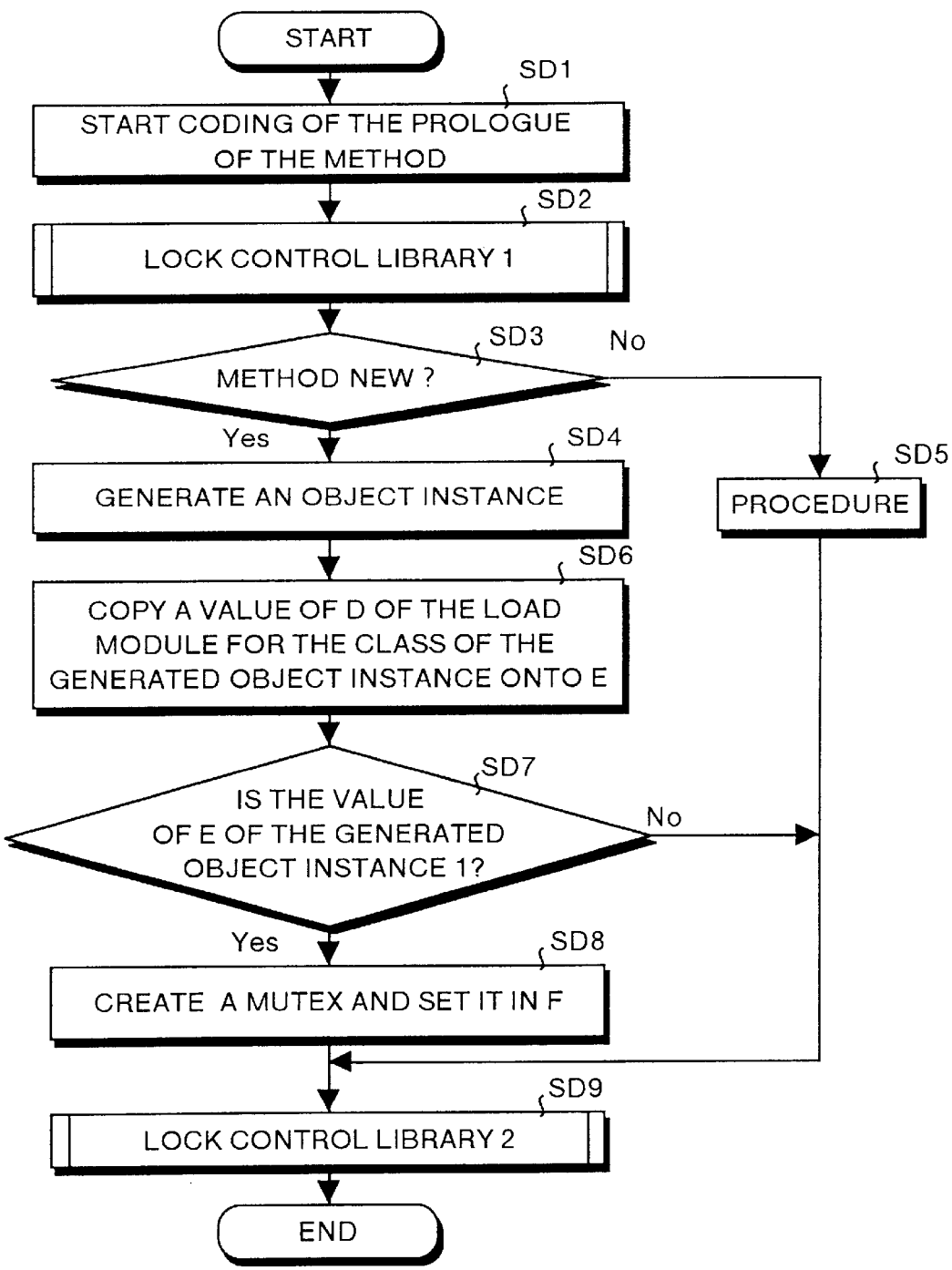
FIG. 10 is a flow chart showing the processing for calling a method in the first embodiment.
Figure 11:
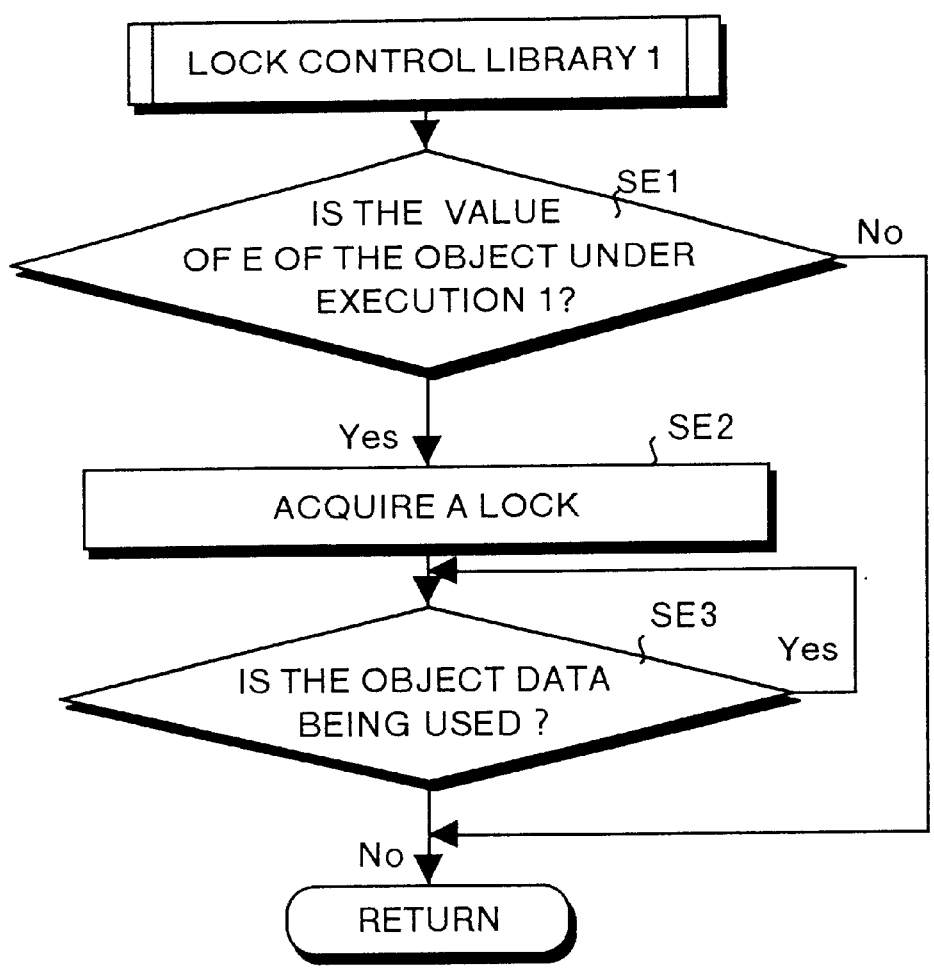
FIG. 11 is a flow chart showing the processing of a lock control library 1 in the first embodiment.

When the call instruction (Refer to ①-2 in FIG. 7) of the method NEW (Refer to FIG. 2) is executed, the processing of calling a method shown in FIG. 10 is executed. Namely, in step SD1, prologue code for the method (the method NEW in this case) is started, and the lock control library 1 shown in FIG. 11 is executed in step SD2. Namely, it is determined in step SE1 whether or not a value of the object-data-retention information E in the factory object (Refer to FIG. 7) for the B class during its execution is "1". In this case, as the object-data-retention information E is "0", the result of the determination in step SE1 is "No", and the system control proceeds to the processing in the main routine shown in FIG. 10. In the next step SD3, it is determined whether the called method is the method NEW or not. The result of determination in this case is "Yes".

In step SD4, an object instance for the B class shown in FIG. 7 is generated according to the factory object (Refer to FIG. 7). In the next step SD6, object-data-retention information D (="1") of a load module (the load module 300$_B$ (Refer to FIG. 2)) for the local class (B class in this case) is copied to an area of the object-data-retention information E in the object instance for the B class shown in FIG. 7. In the next step SD7, it is determined whether the object-data-retention information E is "1" or not. In this case, as the object-data-retention information E is "1", the result of the determination in step SD7 is "Yes". In the next step SD8, a mutex is created, and the mutex is set in the object instance for the B class shown in FIG. 7 as a mutex F. When the result of the determination in step SD7 is "No", the system control proceeds to step SD9.

Figure 12:
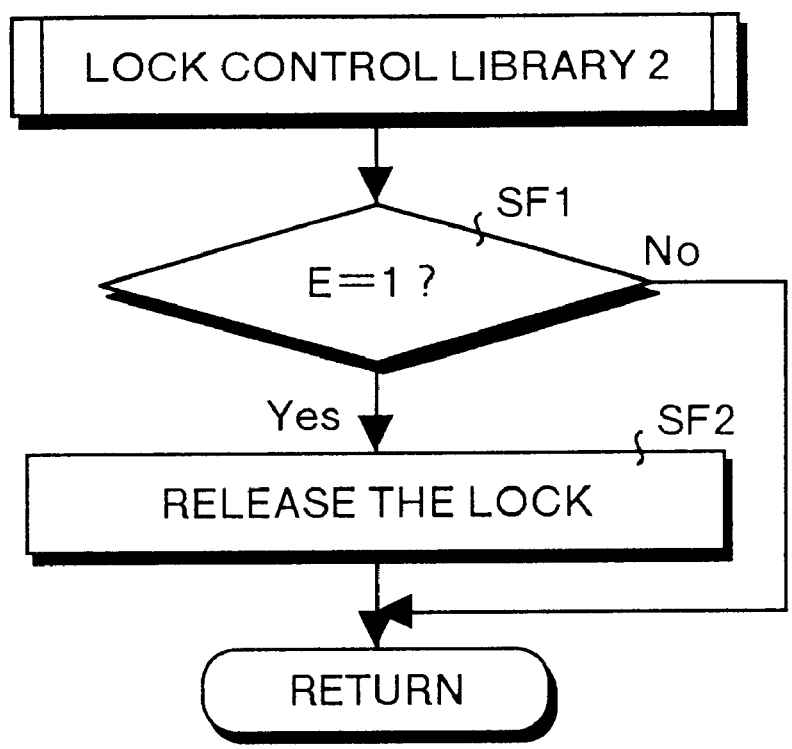
FIG. 12 is a flow chart showing the processing of a lock control library 2 in the first embodiment.

In step SD9, the lock control library 2 shown in FIG. 12 is executed. Namely, in step SF1, it is determined whether the object-data-retention information E in the factory object for the B class shown in FIG. 7E is "1" or not. In this case, as the object-data-retention information E is "0", the result of the determination is "No", and the processing is terminated.

When the call instruction (Refer to ②in FIG. 7) of the method M1 (Refer to FIG. 2) is executed, the processing of calling a method shown in FIG. 10 is executed. Namely, in step SD1, prologue code for the method M1 is started. Then the lock control library 1 shown in FIG. 11 is executed in step SD2. Namely, it is determined in step SE1 whether or not a value of the object-data-retention information E in the object instance (Refer to FIG. 7) for the B class during its execution is "1".

In this case, as the object-data-retention information E is "1", the result of the determination in step SE1 is "Yes". In the next step SE2, the thread acquires a lock from the mutex F in the object instance (Refer to FIG. 7) for the B class. In step SE3, the thread determines whether or not any of the other threads is using the object data for the corresponding object instance by referring to the mutex F.

When the other thread is already using the object data, as the object data is not available, the corresponding thread is in standby by repeating determination in the step SE3. Namely, in the case described herein, there are carried out exclusive controls providing limitation to a single thread that can execute the object instance (method) for the B class and use object data for the object instance. When the other thread finishes the execution of the object instance for the B class and the corresponding object data is available, the result of the determination in step SE3 will be "No", and the thread on standby executes the processing in step SD3 shown in FIG. 10. In step SD3, as the corresponding method is the method M1, the result of determination is "No". In step SD5, the procedure is carried out through execution of the method M1. During execution of the procedure, any of the other threads can not execute the method for the object instance for the B class.

In the next step SD9, the corresponding thread executes the lock control library 2 (Refer to FIG. 12). Namely, in step SF1, it is determined whether the object-data-retention information E in the object instance for the B class shown in FIG. 7E is "1" or not. In this case, as the object-data-retention information E is "1", the result of determination is "Yes", and in step SF2, the thread release the lock from the mutex F shown in FIG. 7. With this operation, the other threads can execute the method for the object instance for the B class.

As described above, in the first embodiment, when compiling the source program SP, the object-data-retention information C, D, and exclusive-control instructions (call instructions of the lock control libraries 1 and 2) are automatically incorporated into the object program OP (load modules 300$_{FJ}$, 300$_A$, and 300$_B$) Therefore, generation of access conflict over the object data (DATA DIVISION) between a plurality of threads can easily be avoided without imposing any particular burden on the user. Further, in this embodiment, the inheritance-relation checker 72 checks the inheritance relationship of a class and automatically incorporates the object-data-retention information C, D, and exclusive-control instructions (call instructions of the lock control libraries 1 and 2) based on to the result of checking into the object program. Therefore, generation of access conflict over the object data between a plurality of threads can easily be avoided based on considerations to the inheritance relationship for the class. This was considered very difficult in the conventional technology.

In the first embodiment, as shown in FIG. 2, a case is described in which the inheritance relationship between the FJBASE class, A class, and B class is checked, and object-data-retention information C and D for object data (DATA DIVISION) are incorporated into the load modules $300_{FJ}$, $300_A$, and $300_B$ respectively considering the inheritance relationship. However, the above-described exclusive controls maybe provided without using the object-data-retention information C and D. Such a case is described hereinafter as a second embodiment of the present invention.

Since configuration in the second embodiment is substantially the same as that shown in FIG. 1, Embodiment 2 is explained below with reference to FIG. 1. However, in the second embodiment, the function of the object-code generator 70 shown in FIG. 1 is different from that in the first embodiment. Further, the inheritance-relation checker 72 is not required. Details of the function of the object-code generator 70 that are different will be explained later.

Figure 14:
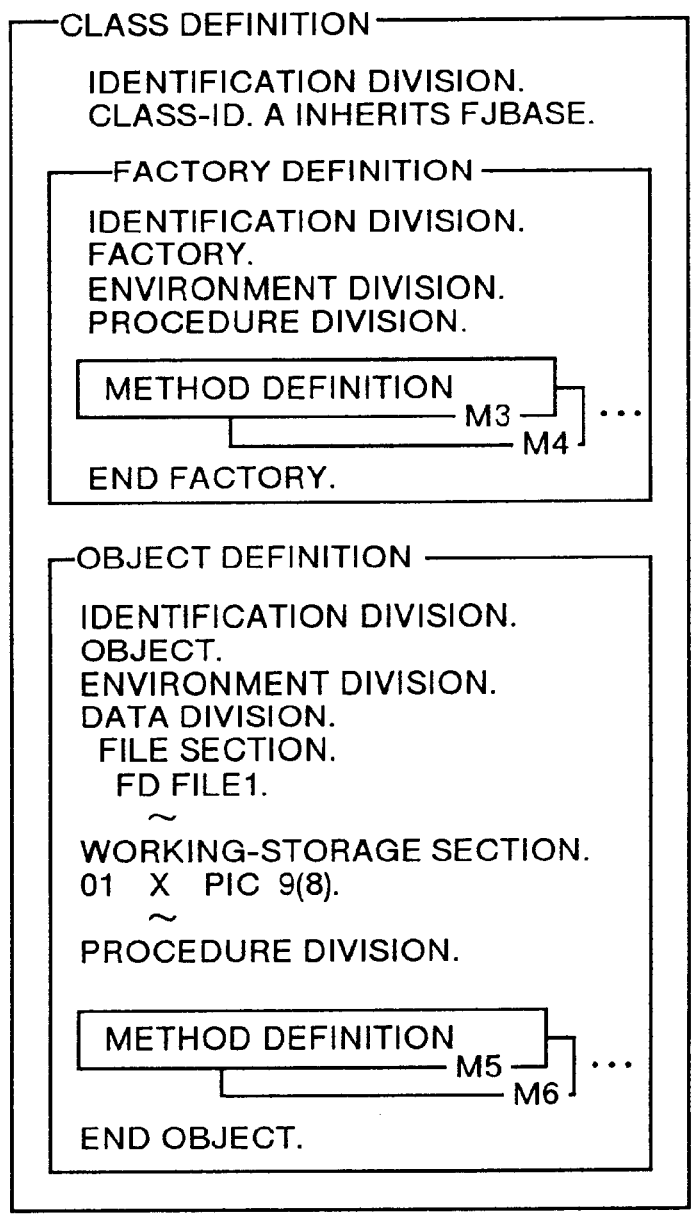
FIG. 14 explain class definition (A) in the second embodiment.
Figure 15:
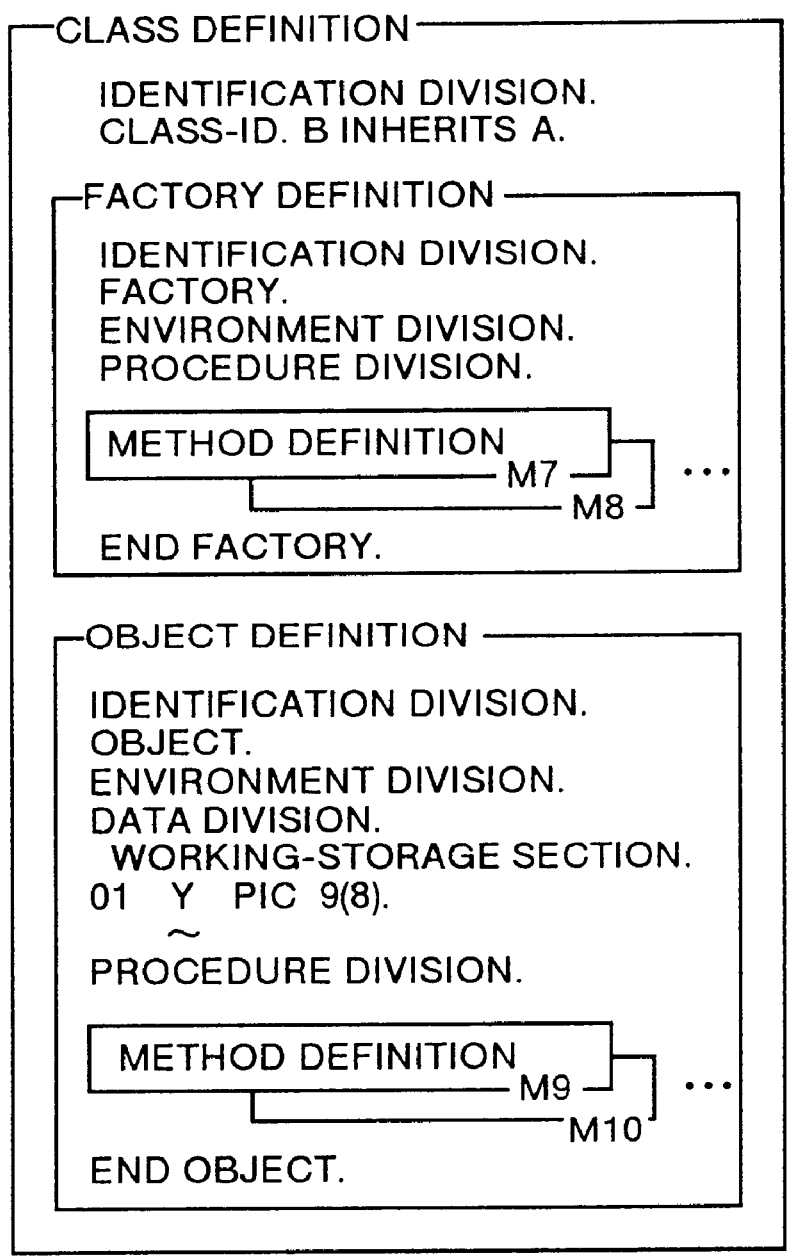
FIG. 15 explain class definition (B) in the embodiment 2.

Operations in the second embodiment will be explained with reference to the flow chart in FIG. 17. In the second embodiment, the source programs $200_{FJ}$, $200_A$, and $200_B$ shown in FIG. 2 are used as the source program SP. Each class definition shown in FIG. 13 to FIG. 15 is defined in those source programs $200_{FJ}$, $200_A$, and $200_B$.

Figure 17:
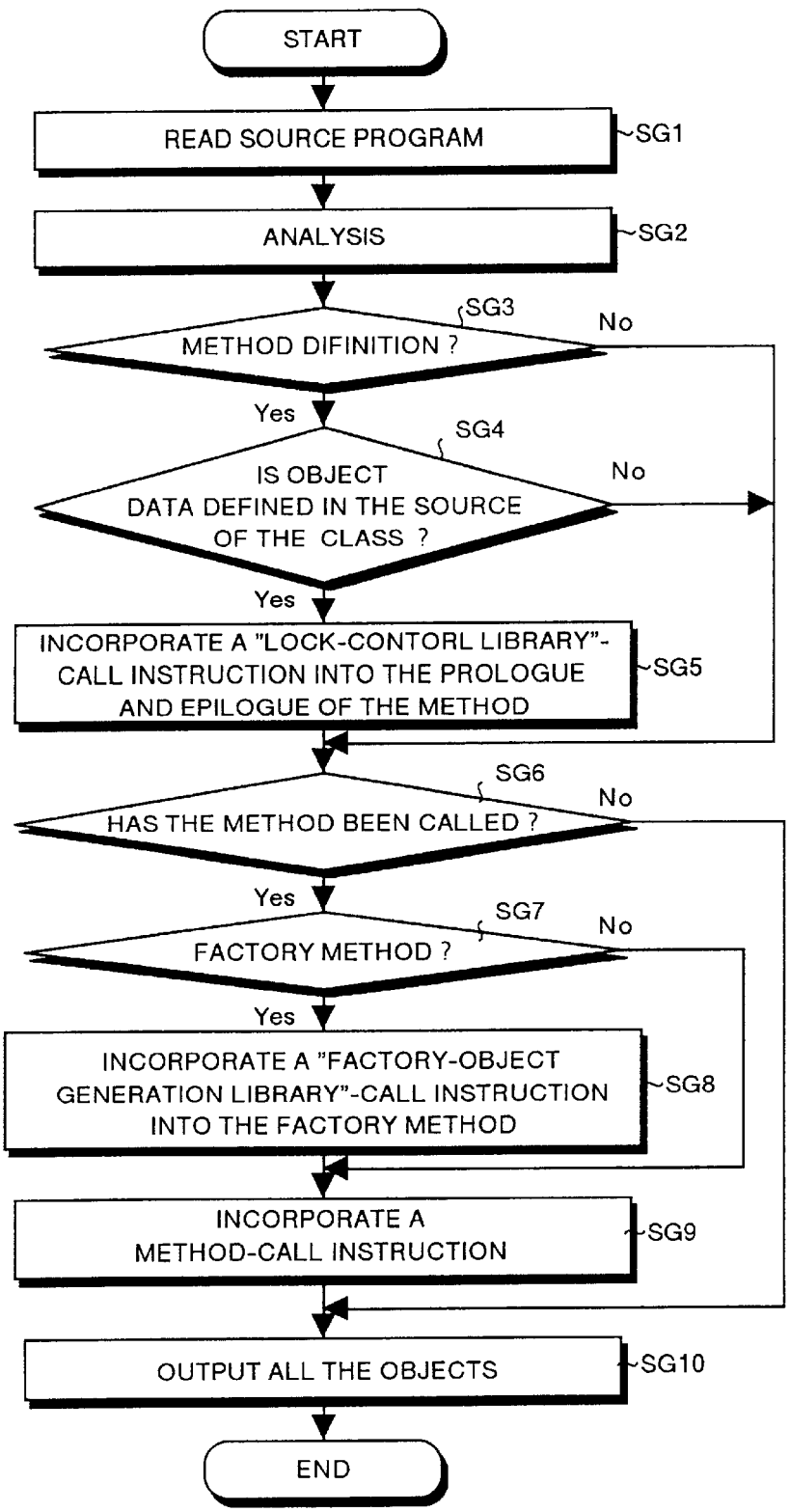
FIG. 17 is a flow chart of operations in the second embodiment.

In step SG1 shown in FIG. 17, at first, the source program $200_{FJ}$ is read into the program analyzer 60. In step SG2, the program analyzer 60 analyzes words/phrases, syntaxes and meaning of the source program $200_{FJ}$. The result of analysis is provided to the object-code generator 70. In step SG3, the object-code generator 70 determines whether or not a method is defined in the class definition of the source program $200_{FJ}$ shown in FIG. 13 like in step SA4 (Refer to FIG. 6). In this case, as shown in FIG. 13, the method NEW is defined in the factory definition and the methods M1 and M2 are defined in the object definition. Therefore, the object-code generator 70 regards the result of the determination in step SG3 as "Yes" and executes the processing in step SG4. When a method is not defined therein, the object-code generator 70 regards the result of the determination in step SG3 as "No" and executes the processing in step SG6.

In step SG4, the object data detector 71 determines whether or not the object data (DATA DIVISION) is defined in the class definition (FJBASE) shown in FIG. 13. In this case, as the object data is not defined therein, the object data detector 71 regards the result of the determination as "No" and executes the processing in step SG6. In step SG6, the object-code generator 70 determines whether or not calling of a method is programmed in the source program $200_{FJ}$ shown in FIG. 13 by, for instance, the class-user program shown in FIG. 18, and executes the processing in step SG10 when a result of the determination is "No". The class-user program shown in FIG. 18 is the same as that shown in FIG. 7 described above excluding the point that the method M1 is changed to method M5.

Figure 16C:
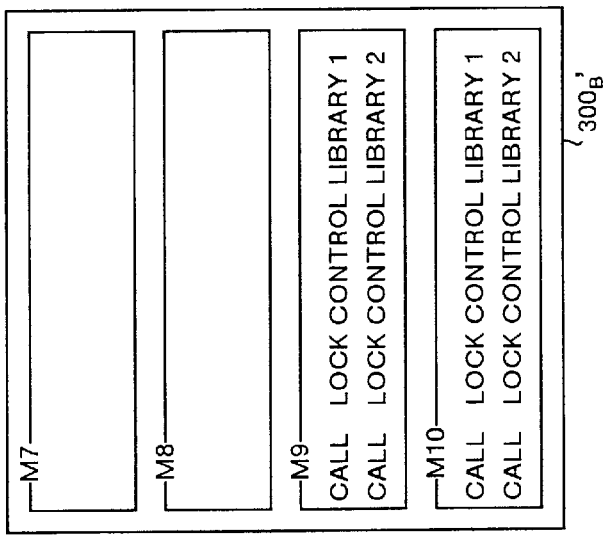
FIG. 16 is a view showing a load module in the second embodiment.

When the result of the determination in step SG6 is "Yes", in step SG7, the object-code generator 70 determines whether or not a method to be called is a factory method (e.g., method NEW shown in FIG. 13) defined in the factory definition. When the result of the determination is "Yes" the object-code generator 70 executes the processing in step SG8. When the result of the determination in step SG7 is "No", the object-code generator 70 executes the processing in step SG9. In step SG8, the object-code generator 70 incorporates the "factory-object generation library"-call instruction for calling the factory-object generation library (Refer to FIG. 19) into a load module $300_{FJ}'$ (Refer to FIG. 16).

In step SG9, the object-code generator 70 incorporates an instruction (method-call instruction) for calling a method of which calling is instructed in the user program (Refer to FIG. 18) into the load module $300_{FJ}'$, and executes the processing in step SG10. In step SG10, the object-code generator 70 outputs all the objects (the load module $300_{FJ}'$ in this case). With this operation, compilation of the source program $200_{FJ}$ is finished.

When the source program $200_A$ is read into the program analyzer 60 in step SG1, the program analyzer 60 in step SG2 analyzes words/phrases, syntaxes and meaning of the source program $200_A$. The result of analysis is provided to the object-code generator 70. In step SG3, the object-code generator 70 determines whether or not a method is defined in the class definition of the source program $200_A$ shown in FIG. 14. As shown in FIG. 14, methods M3 and M4 are defined in the factory definition and methods M5 and M6 are defined in the object definition. Therefore, the object-code generator 70 regards the result of the determination in step SG3 as "Yes".

Figure 16B:
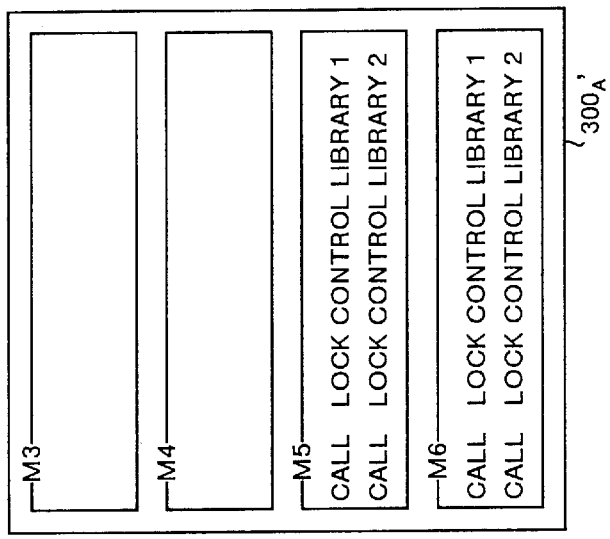
Figure 16A:
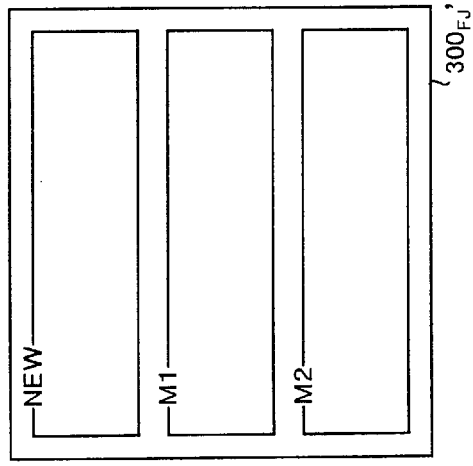

In step SG4, the object data detector 71 determines whether or not the object data (DATA DIVISION) is defined in the class definition (A) shown in FIG. 13. In the case described herein, as the object data (DATA DIVISION) for the methods M5 and M6 is defined in the object definition, the object data detector 71 regards the result of the determination as "Yes". In step SG5, the object-code generator 70 incorporates a "lock control library 1"-call instruction (Refer to FIG. 18) for calling the lock control library 1 (Refer to FIG. 21) into the prologue of the methods M5 and M6 (procedures) as shown in FIG. 16B into a load module $300_A'$. The lock control library 1 is a library for executing the processing of acquiring the lock.

Further, the object-code generator 70 incorporates, as shown in FIG. 16B, a "lock control library 2"-call instruction for calling the lock control library 2 (Refer to FIG. 22) into the epilogue of the methods M5 and M6 (procedures) into the load module $300_A'$, and executes the processing in step SG6. In step SG6 to step SG9, the source program $200_A$ (A class) is processed in the similarly manner as explained above. In step SG10, the object-code generator 70 outputs all the objects (the load module $300_A'$ in this case). With this operation, compilation of the source program $200_A$ is finished.

When the source program $200_B$ is read into the program analyzer 60 in step SG1, the program analyzer 60 in step SG2 analyzer words/phrases, syntaxes and meaning of the source program $200_B$. The result of this analysis is provided to the object-code generator 70. In step SG3, the object-code generator 70 determines whether or not a method is defined in the class definition of the source program $200_B$ shown in FIG. 15. As shown in FIG. 15, methods M7 and M8 are defined in the factory definition and methods M9 and M10 are defined in the object definition. Therefore, the object-code generator 70 regards the result of the determination in step SG3 as "Yes".

In step SG4, the object data detector 71 determines whether or not the object data (DATA DIVISION) is defined in the class definition (B) shown in FIG. 15. In this case described herein, as the object data (DATA DIVISION) for the methods M9 and M10 is defined in the object definition, the object data detector 71 regards the result of the determination as "Yes". In step SG5, the object-code generator 70 incorporates a "lock control library 1"-call instruction (Refer to FIG. 18) for calling the lock control library 1 (Refer to FIG. 21) into the prologue of the methods M9 and M10 (procedures) as shown in FIG. 16C into a load module $300_A'$ (Refer to FIG. 16). The lock control library 1 is a library for executing processing of acquiring the lock.

Further, the object-code generator 70 incorporates, as shown in FIG. 16C, a "lock control library 2"-call instruction for calling the lock control library 2 (Refer to FIG. 22) onto the epilogue of the methods M9 and M10 (procedures) into the load module $300_B'$, and executes the processing in step SG6. In step SG6 to step SG9, the source program $200_B$ (B class) is processed in the manner similar to the operations described above. In step SG10, the object-code generator 70 outputs all the objects (the load module $300_B'$ in this case). With this operation, compilation of the source program $200_B$ is finished.

Figure 19:
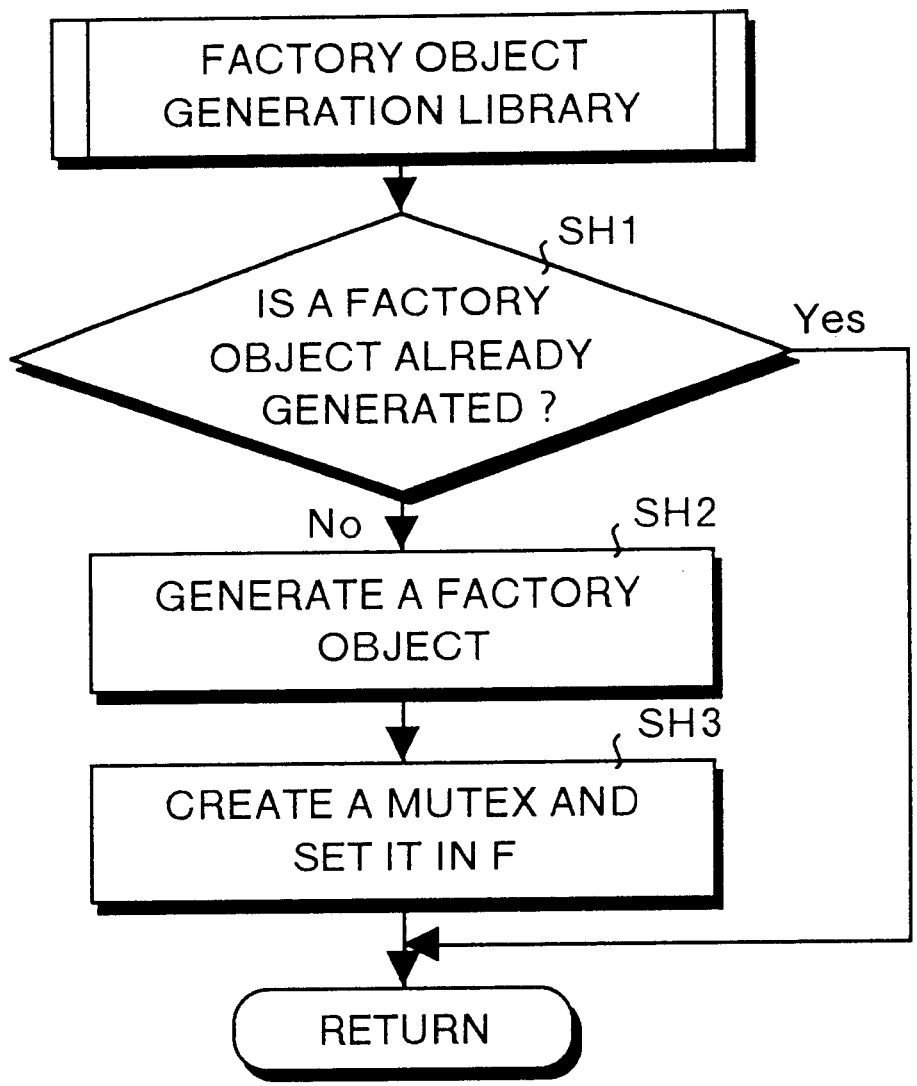
FIG. 19 is a flow chart showing the processing of a factory-object generation library in the second embodiment.

Processing performed for executing the program is explained below with reference to the flow charts shown in FIG. 19 to FIG. 22. A case is described below where the information processing unit 10 shown in FIG. 1 is a server and a plurality of clients (not shown) connected to the server access this server to execute the load module $300_B'$ shown in FIG. 16. When a thread is generated in response to actuation from the client and an object program corresponding to a class-user program shown in FIG. 18 is executed, the factory-object generation library shown in FIG. 19 is called (Refer to ①-1 in FIG. 18).

In step SH1, it is determined whether or not a factory object is already generated or not similarly to that in step SC1 (Refer to FIG. 9). When the result of this determination is "Yes", the processing in the main routine is executed. In the case described herein, assuming that the result of the determination in step SH1 is "No", the factory object for the B class shown in FIG. 18 is generated in step SH2. In the next step SH3, a mutex is created similarly to that instep SC5 (Refer to FIG. 9), and the mutex is set in the factory object shown in FIG. 18 as a mutex F. The mutex is a flag for providing exclusive controls that only one thread among a plurality of threads is made executable and the other threads are in the standby state of execution as described in the first embodiment.

Figure 20:
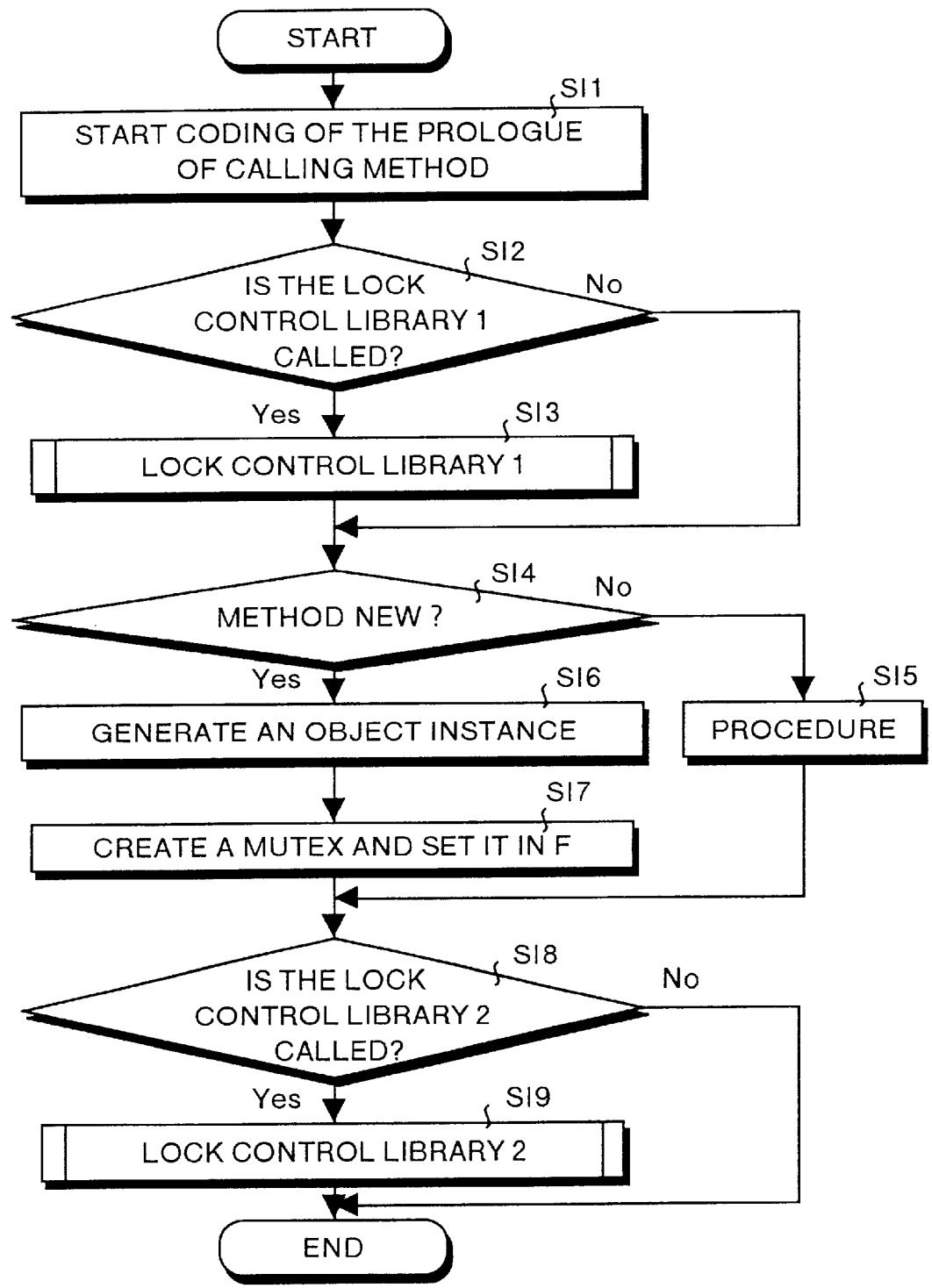
FIG. 20 is a flow chart showing the processing of calling a method in the second embodiment.

When a call instruction (Refer to ①-2 in FIG. 18) of the method NEW (Refer to FIG. 16A) is executed, the processing for calling the method shown in FIG. 20 is executed. Namely, in step SI1, prologue code for the method (the method NEW in this case) is started. In step SI2, it is determined whether the lock control library 1 for the method NEW is called or not. In the case described herein, as a call instruction of the lock control library 1 is not specified in the method NEW shown in FIG. 16A, the result of the determination in step SI2 is "No". In the next step SI4, it is determined whether or not the called method is the method NEW, and the result of the determination in this case is "Yes".

With the operation, in step SI6, an object instance for the B class shown in FIG. 18 is generated based on the factory object. In the next step SI7, a mutex is created similarly to that in step SD8 (Refer to FIG. 10), and the mutex is set in the object instance for the B class shown in FIG. 18 as a mutex F. When the result of the determination in step SI4 is "No", the processing in step SI5 is executed.

In step SI8, it is determined whether a lock control library 2 for the method NEW is called or not. In the case described herein, as a call instruction of the lock control library 2 is not specified in the method NEW shown in FIG. 16A, the result of the determination in step SI8 is "No", the processing is terminated. As described above, when the method NEW in which object data (DATA DIVISION) is not defined is executed, as the lock control is not carried out, the method NEW is concurrently executed by a plurality of threads. In the case of the other methods M1, M2, M3, M4, M7, and M8 each in which object data is not defined (Refer to FIGS. 16A, 16B, and 16C), the operation is also the same as that in the case of the method NEW.

Figure 21:
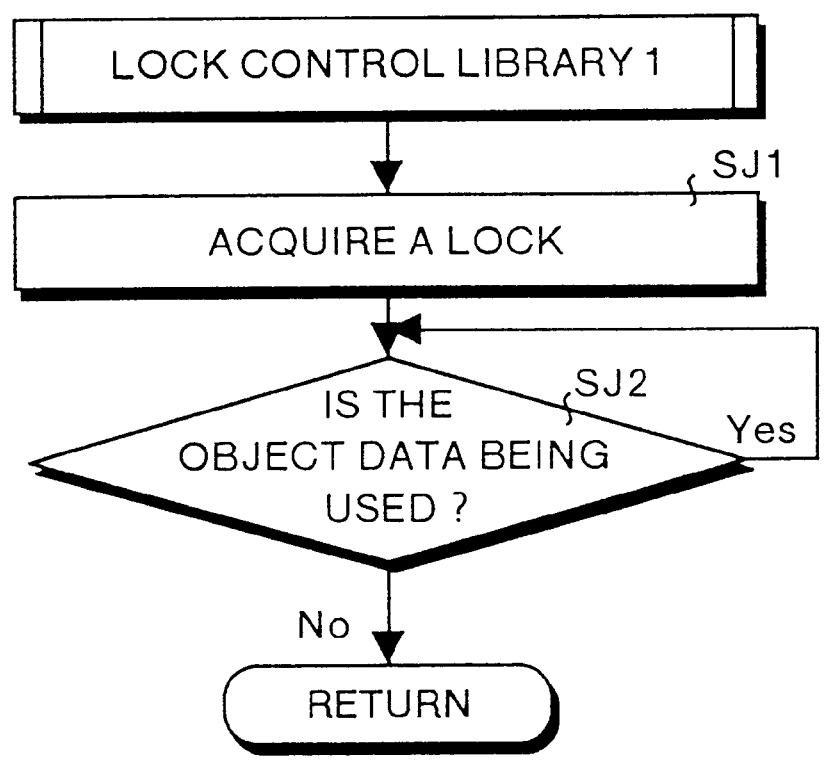
FIG. 21 is a flow chart showing the processing of a lock control library 1 in the second embodiment.

When a call instruction (Refer to ② in FIG. 18) of the method M5 (Refer to FIG. 16B) is executed, the processing of calling the method shown in FIG. 20 is executed. Namely, in step SI1, prologue code for the method M5 is started. In step SI2, it is determined whether the lock control library 1 for the method M5 is called or not. In this case, as a call instruction of the lock control library 1 is specified in the method M5 shown in FIG. 16B, the result of the determination in step SI2 is "Yes". In step SI3, the lock control library 1 shown in FIG. 21 is executed. Namely, in step SJ1, the thread acquires a lock from the mutex F in the object instance (Refer to FIG. 18E) for the B class. Instep SJ2, the thread determines whether or not any of the other threads is using the object data for the object instance by referring to the mutex F.

When the other thread is already using the object data, as the object data is not available, the corresponding thread goes into a standby state and repeats the determination in step SJ2. Namely, in this case, only one thread can execute the object instance (method) for the B class and use object data for the object instance. When the other thread ends execution of the object instance for the B class and the corresponding object data is available, the result of the determination in step SJ2 is "No", and the thread in standby state executes the processing in step SI4 shown in FIG. 20. In step SI4, as the corresponding method is the method M5, the result of determination is "No". In step SI5, the procedure is carried out through execution of the method M5. During execution of the procedure, any of the other threads can not execute the method for the object instance for the B class.

Figure 22:
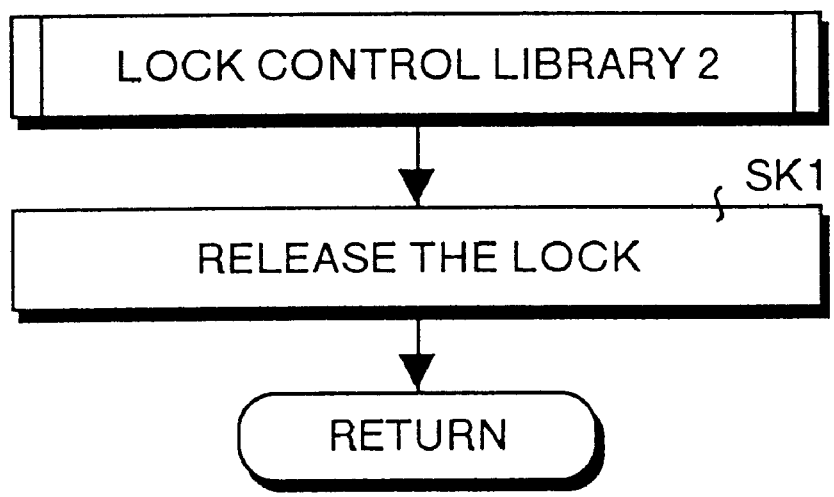
FIG. 22 is a flow chart showing the processing of a lock control library 2 in the second embodiment.
Figure 23:
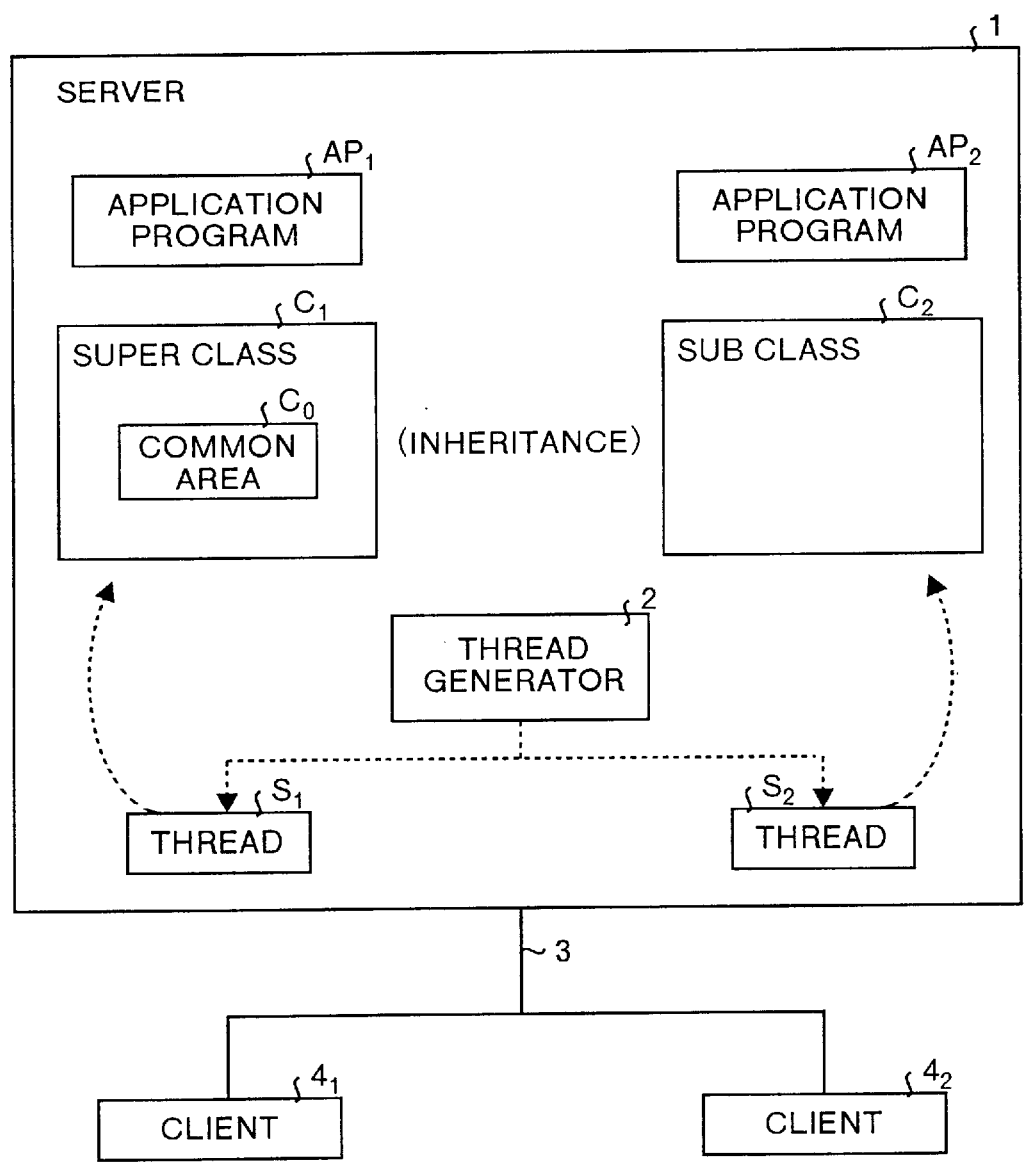
FIG. 23 is a block diagram showing configuration of an example based on the conventional technology.

In step SI8, it is determined whether a lock control library 2 for the method M5 is called or not. In this case, as a call instruction of the lock control library 2 is specified in the method M5 shown in FIG. 16B, the result of the determination in step SI8 is "Yes". In step SI9, the lock control library 2 shown in FIG. 22 is executed. Namely, in step SK1, the thread releases the lock from the mutex F shown in FIG. 18. Thus, the other threads can execute the method for the object instance for the B class. As described above, when the method M5 in which object data (DATA DIVISION) is defined is executed, as the lock control (exclusive control) is carried out, a number of threads which can execute the method M5 is limited to a single thread. In the case of the other methods M6, M9, and M10 each in which object data is defined (Refer to FIGS. 16B and 16C), the operation is also the same as that in the case of the method M5.

As described above, according to the second the embodiment, when compiling the source program SP, the exclusive-control instructions (call instructions of the lock control libraries 1 and 2) are automatically incorporated into the object program (load module $300_A'$, and so on). Therefore, generation of access conflict over the object data (DATA DIVISION) between a plurality of threads can easily be avoided without imposing any particular burden on the user.

Although the present invention is described in detail with respect to the first and second embodiments with reference to the attached drawings, the appended claims are not to be thus limited but are to be construed as embodying all modifications and alternative constructions that may occur to one skilled in the art which fairly fall within the basic teaching herein set forth. For example, in the first and second embodiments, functions of the compiler device may be realized by recording a compiler (program) for realizing the functions of the compiler device in the computer-readable recording medium 120. Thus compiler recorded in the recording medium 120 may be loaded into the computer and executed. The recording medium 120 may be any portable type of recording medium such as a CD-ROM, an optical disk, a floppy disk, or a hard disk. Further, the compiler may be provided through a network.

As described above, according to this invention, when compiling the object program, object-data-retention information and exclusive-control instruction are automatically incorporated into the object program. Therefore, generation of access conflict over the object data between a plurality of threads can easily be avoided without imposing any particular burden on the user.

Further, when compiling the object program, inheritance relationship for a class is checked, and object-data-retention information and exclusive-control instruction based on the result of checking are automatically incorporated into the object program. Therefore, generation of access conflict over the object data between a plurality of threads can easily be avoided without imposing any particular burden on the user. This was thought difficult in the conventional technology.

Further, when compiling the object program, exclusive-control instruction is automatically incorporated into the object program. Therefore, generation of access conflict over the object data between a plurality of threads can easily be avoided without imposing any particular burden on the user.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A compiler device which generates an object program for executing a method, the object program to be executed through generation of a thread by compiling a source program based on object-oriented programming; said compiler device comprising:

a detection unit which detects presence or absence, in the source program, of an object data for the method, based on a class definition in the source program;

a first incorporation unit which incorporates a result of detection by said detection unit into the object program as object-data-retention information; and a second incorporation unit which incorporates into the object program, when executing the object program, an exclusive-control instruction for controlling the object data such that only one of a plurality of threads can execute the method based on the object-data-retention information.

2. The compiler device according to claim 1 further comprising an inheritance-relation check unit which checks an inheritance relationship for a class based on the class definition in the source program; wherein said detection unit detects presence or absence of an object data for a method of a class inherited by the class based on the result of checking by said inheritance-relation check unit, and said second incorporation unit incorporates, when executing the object program, an exclusive-control instruction for controlling such that only one of a plurality of said threads can execute the method of a class inherited by the class into the object program based on the object-data-retention information.

3. A compiler device which generates an object program for executing a method, the object program to be executed through generation of a thread by compiling a source program based on object-oriented programming; said compiler device comprising:

a detection unit which detects presence or absence, in the source program, of an object data for the method, based on a class definition in the source program; and an incorporation unit which incorporates into the object program, when executing the object program, an exclusive-control instruction for controlling the object data such that only one of a plurality of threads can execute the method for which the object data is detected by said detection unit.

4. A computer-readable recording medium with a compiler recorded therein, which compiler generates an object program for executing a method, the object program to be executed through generation of a thread by compiling a source program based on object-oriented programming; said compiler making a computer execute:

a detection step of detecting presence or absence, in the source program, of an object data for the method based on a class definition in the source program;

a first incorporation step of incorporating a result of detection in the detection step into the object program as object-data-retention information; and a second incorporation step of incorporating into the object program, when executing the object program, an exclusive-control instruction for controlling the object data such that only one of a plurality of threads can execute the method based on the object-data-retention information.

5. The computer-readable medium with the compiler according to claim 4 further making a computer execute an inheritance-relation check step of checking an inheritance relationship for a class based on the class definition in the source program; wherein in the detection step, presence or absence of object data for a method of a class inherited by the class is detected according to a result of checking in the inheritance-relation check step, and in the second incorporation step, when executing the object program, an exclusive-control instruction for controlling so that only one of a plurality of threads can execute the method of a class inherited by the class is incorporated into the object program based on the object-data-retention information.

6. A computer-readable recording medium with a compiler recorded therein, which compiler generates an object program for executing a method, the object program to be executed through generation of a thread by compiling a source program based on object-oriented programming; said compiler making a computer execute:

a detection step of detecting presence or absence, in the source program, of an object data for the method, based on a class definition in the source program; and an incorporation step of incorporating into the object program, when executing the object program, an exclusive-control instruction for controlling the object data such that only one of a plurality of threads can execute the method for which the object data is detected in the detection step.

* * * * *